US012057633B2

(12) United States Patent
Sudo et al.

(10) Patent No.: US 12,057,633 B2
(45) Date of Patent: Aug. 6, 2024

(54) ANTENNA MODULE AND COMMUNICATION DEVICE

(71) Applicant: Murata Manufacturing Co., Ltd., Kyoto (JP)

(72) Inventors: Kaoru Sudo, Kyoto (JP); Kengo Onaka, Kyoto (JP); Hirotsugu Mori, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 265 days.

(21) Appl. No.: 17/370,504

(22) Filed: Jul. 8, 2021

(65) Prior Publication Data

US 2021/0336348 A1 Oct. 28, 2021

Related U.S. Application Data

(63) Continuation of application No. PCT/JP2020/004062, filed on Feb. 4, 2020.

(30) Foreign Application Priority Data

Feb. 8, 2019 (JP) ................................ 2019-021976

(51) Int. Cl.

*H01Q 13/08* (2006.01)
*H01Q 1/42* (2006.01)
*H01Q 5/385* (2015.01)

(52) U.S. Cl.

CPC ............ *H01Q 13/08* (2013.01); *H01Q 1/422* (2013.01); *H01Q 5/385* (2015.01)

(58) Field of Classification Search

CPC ........ H01Q 1/38; H01Q 1/2238; H01Q 1/422; H01Q 21/065; H01Q 21/28; H01Q 21/30; H01Q 9/04; H01Q 9/0407; H01Q 9/0414

See application file for complete search history.

(56) References Cited

U.S. PATENT DOCUMENTS

2002/0041255 A1* 4/2002 Baba .................... H01Q 9/0442 343/846
2008/0266178 A1 10/2008 Tiezzi et al.
(Continued)

FOREIGN PATENT DOCUMENTS

CN 102856640 A 1/2013
CN 104662737 A 5/2015
(Continued)

OTHER PUBLICATIONS

International Search Report for International Patent Application No. PCT/JP2020/004062 dated Apr. 21, 2020.
(Continued)

*Primary Examiner* — Seokjin Kim
(74) *Attorney, Agent, or Firm* — Pearne & Gordon LLP

(57) ABSTRACT

The present disclosure reduces a loss of strength of a radio-frequency signal radiated from an antenna module covered with a housing. An antenna module (100) includes a dielectric substrate (130), a driven element (141), and a ground conductor (190). The dielectric substrate (130) has a multilayer structure. The driven element (141) is disposed in or on the dielectric substrate (130). The ground conductor (190) is disposed between the driven element (140) and a mounting surface (132) on which a power supply circuit is mountable. The power supply circuit supplies the driven element (140) with radio-frequency power. The dielectric substrate has at least one groove (150). The at least one groove (150) is separate from the driven element (140) when the antenna module (100) is viewed in plan. The at least one groove (150) extends toward the ground conductor (190) from a layer on which the driven element (140) is disposed.

16 Claims, 26 Drawing Sheets

(56) References Cited

U.S. PATENT DOCUMENTS

| | | | |
|---|---|---|---|
| 2015/0194730 A1 | 7/2015 | Sudo et al. | |
| 2017/0222316 A1 | 8/2017 | Mizunuma et al. | |
| 2019/0089053 A1* | 3/2019 | Yong | H01Q 1/38 |
| 2020/0106183 A1* | 4/2020 | Fabrega Sanchez | H01Q 1/243 |

FOREIGN PATENT DOCUMENTS

| | | | | | |
|---|---|---|---|---|---|
| JP | 2002-151929 A | | 5/2002 | |
| JP | 2007-068037 A | | 3/2007 | |
| JP | 2007068037 A | * | 3/2007 | |
| WO | 2006/032305 A1 | | 3/2006 | |
| WO | 2016/063759 A1 | | 4/2016 | |
| WO | WO-2018048061 A1 | * | 3/2018 | H01Q 21/06 |

OTHER PUBLICATIONS

Written Opinion for International Patent Application No. PCT/JP2020/004062 dated Apr. 21, 2020.

* cited by examiner

| WIDTH W[mm] | DEPTH [mm] | f0 [GHz] | BW [GHz] |
|---|---|---|---|
| 0 | 0 | 27.9 | 3.3 |
| 1 | 0.2 | 29.4 | 3.7 |
| 1 | 0.4 | 30.2 | 3.7 |
| 1 | 0.6 | 30.7 | 3.7 |

| WIDTH W[mm] | DEPTH [mm] | f0 [GHz] | BW [GHz] |
|---|---|---|---|
| 0 | 0 | 28.0 | 3.5 |
| 1 | 0.2 | 29.2 | 3.6 |
| 1 | 0.4 | 29.9 | 3.7 |
| 1 | 0.6 | 30.4 | 3.6 |

| WIDTH W[mm] | DEPTH [mm] | f0 [GHz] | BW [GHz] |
|---|---|---|---|
| 0 | 0 | 27.9 | 3.3 |
| 1 | 0.2 | 29.1 | 3.6 |
| 1 | 0.4 | 29.8 | 3.6 |
| 1 | 0.6 | 30.3 | 3.6 |

| WIDTH W[mm] | DEPTH [mm] | f0 [GHz] | BW [GHz] |
|---|---|---|---|
| 0 | 0 | 28.0 | 3.4 |
| 1 | 0.2 | 30.1 | 3.9 |
| 1 | 0.4 | 31.2 | 4.1 |
| 1 | 0.6 | 31.9 | 4.1 |

ANTENNA MODULE AND COMMUNICATION DEVICE

CROSS REFERENCE TO RELATED APPLICATIONS

This is a continuation of International Application No. PCT/JP2020/004062 filed on Feb. 4, 2020 which claims priority from Japanese Patent Application No. 2019-021976 filed on Feb. 8, 2019. The contents of these applications are incorporated herein by reference in their entireties.

BACKGROUND OF THE DISCLOSURE

Field of the Disclosure

Embodiments described herein relate to an antenna module and a communication device.

Description of the Related Art

An antenna module proposed in, for example, Patent Document 1 includes a driven element, a power supply circuit, and a feed line. The driven element radiates a radio-frequency signal. The power supply circuit supplies the driven element with radio-frequency power. The radio-frequency power from the power supply circuit is transmitted through the feed line.

Patent Document 1: International Publication No. 2016/063759

BRIEF SUMMARY OF THE DISCLOSURE

Such an antenna module is typically covered with a housing for adoption into a communication device. With the housing being fitted over the antenna module, the parasitic capacitance of the housing can cause the resonant frequency of the driven element to vary. The variations in resonant frequency give rise to a loss of strength of radio-frequency signals radiated from the driven element.

Embodiments described herein address the above-mentioned problem of reducing a loss of strength of a radio-frequency signal radiated from an antenna module covered with a housing.

An antenna module according to an aspect of the present disclosure includes a dielectric member and at least one radiation electrode. The at least one radiation electrode is disposed in or on the dielectric member. The dielectric member has at least one groove separate from the at least one radiation electrode and extending toward a ground electrode facing the at least one radiation electrode from a surface on which the at least one radiation electrode is disposed.

Embodiments described herein are conducive to reducing the loss of strength of the radio-frequency signal radiated from the antenna module covered with a housing.

Figure 2A:
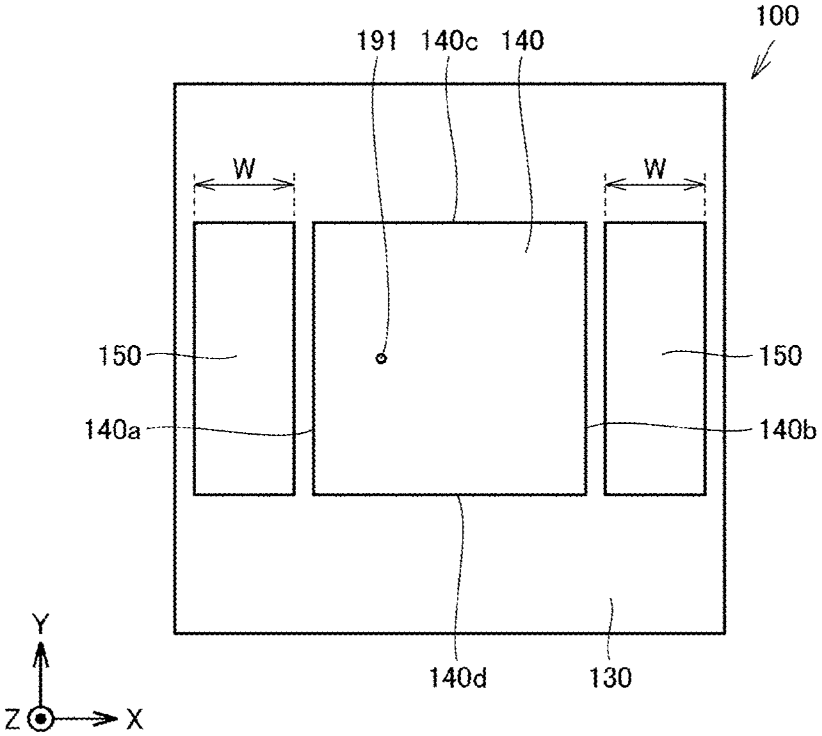
Figure 2B:
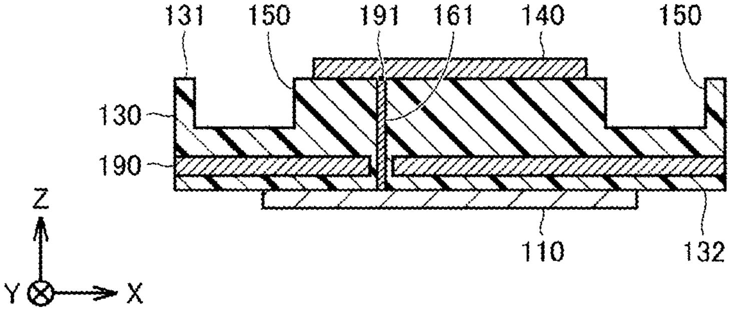

Each of FIGS. 2A and 2B illustrates part of the antenna module according to the embodiment concerned.

Figure 3:
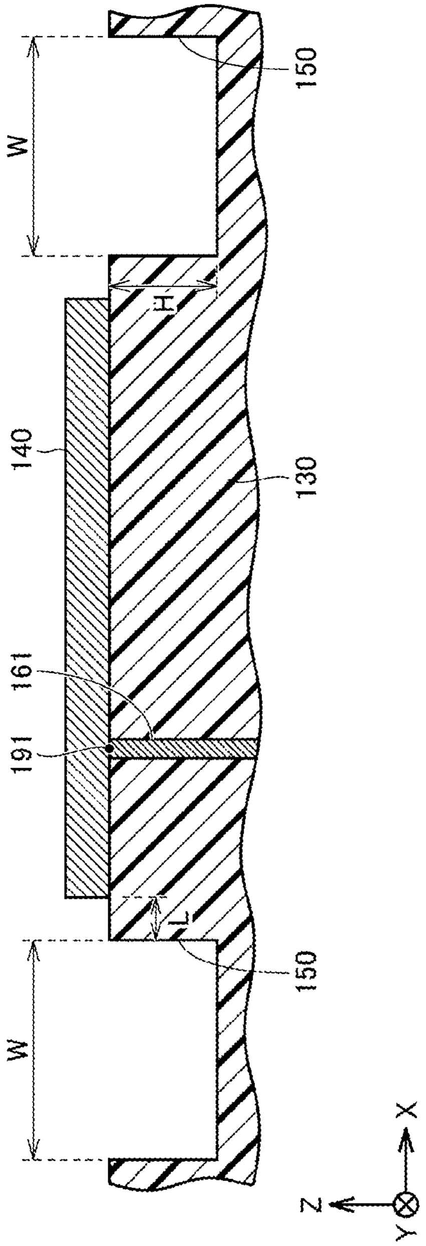

FIG. 3 is an enlarged view of part of the antenna module according to the embodiment concerned.

Figures 4A, 4B:
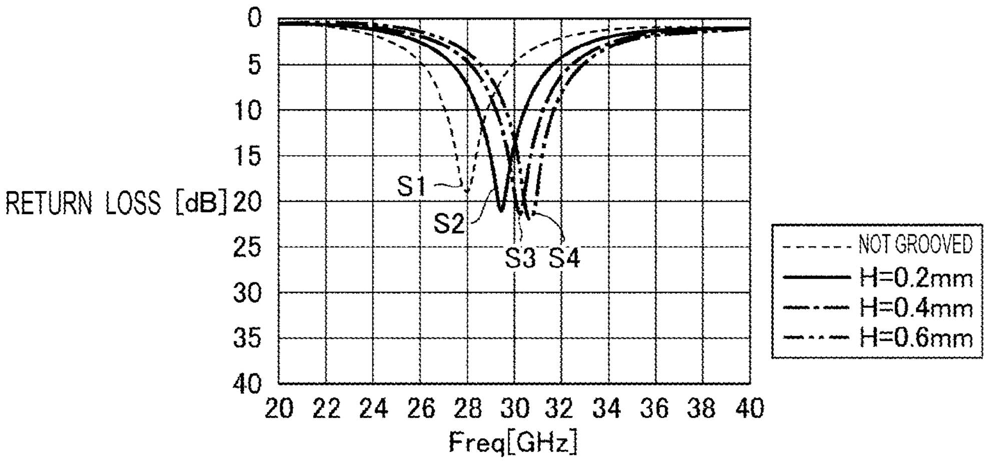

FIGS. 4A and 4B illustrate the results of simulations conducted on the antenna module according to the embodiment concerned.

Figure 5A:
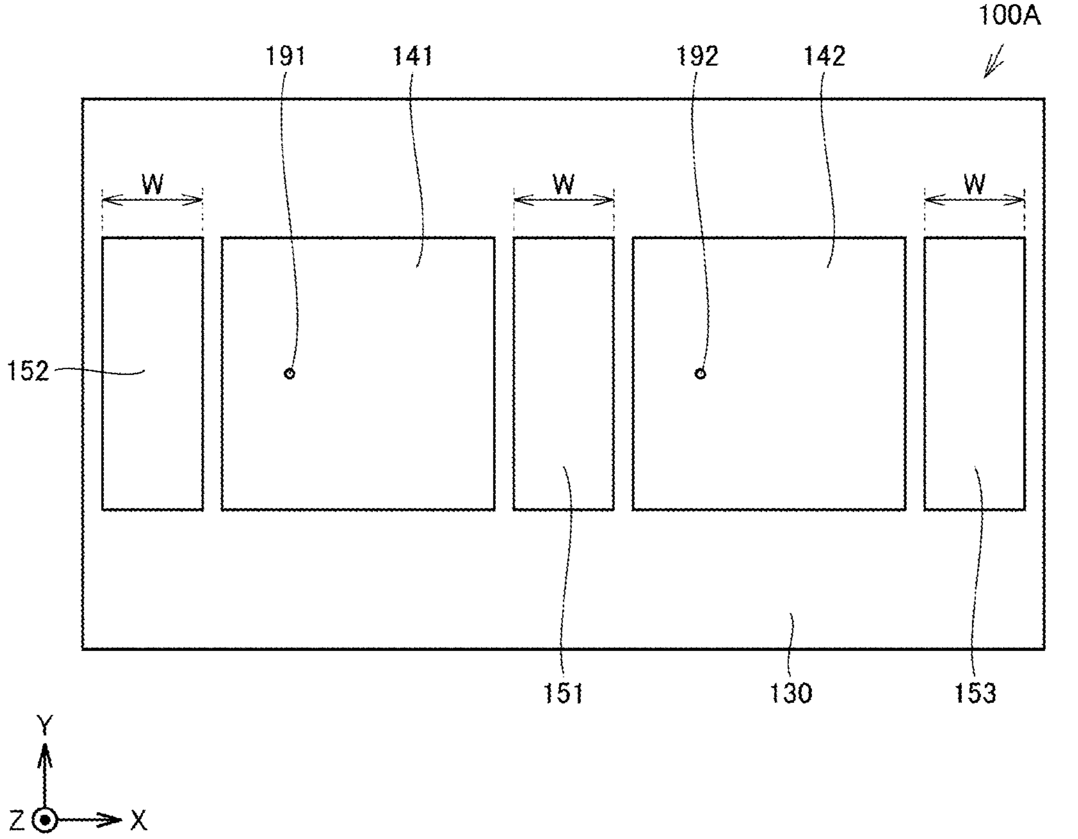
Figure 5B:
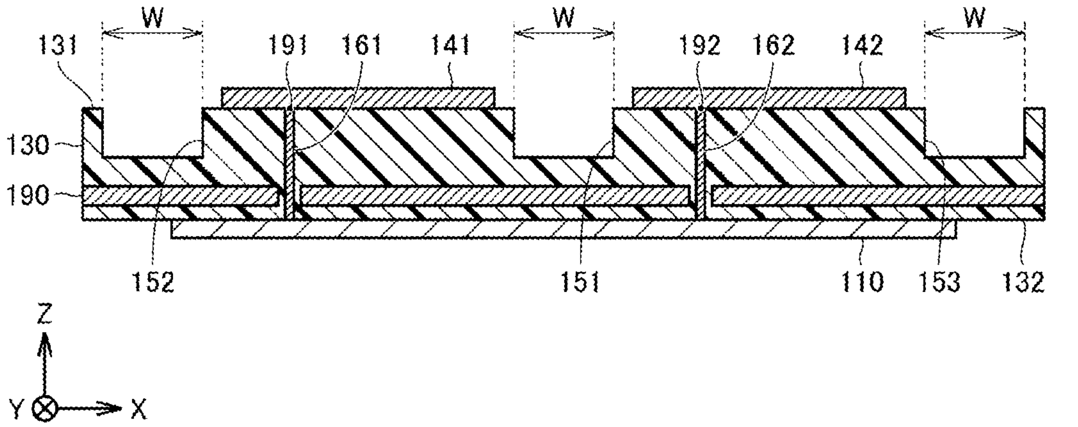

Each of FIGS. 5A and 5B illustrates part of an antenna module according to a second embodiment.

Figures 6A, 6B:
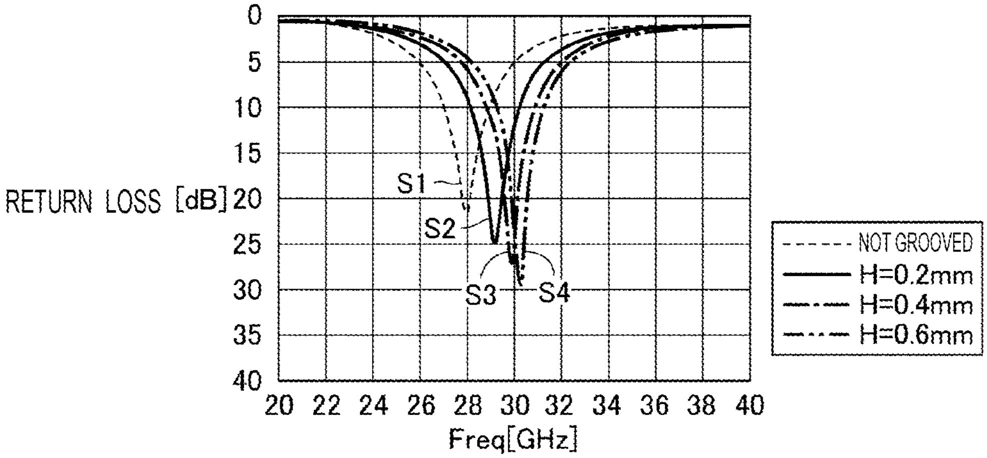

FIGS. 6A and 6B illustrate the results of simulations conducted on the antenna module according to the second embodiment.

Figure 7:
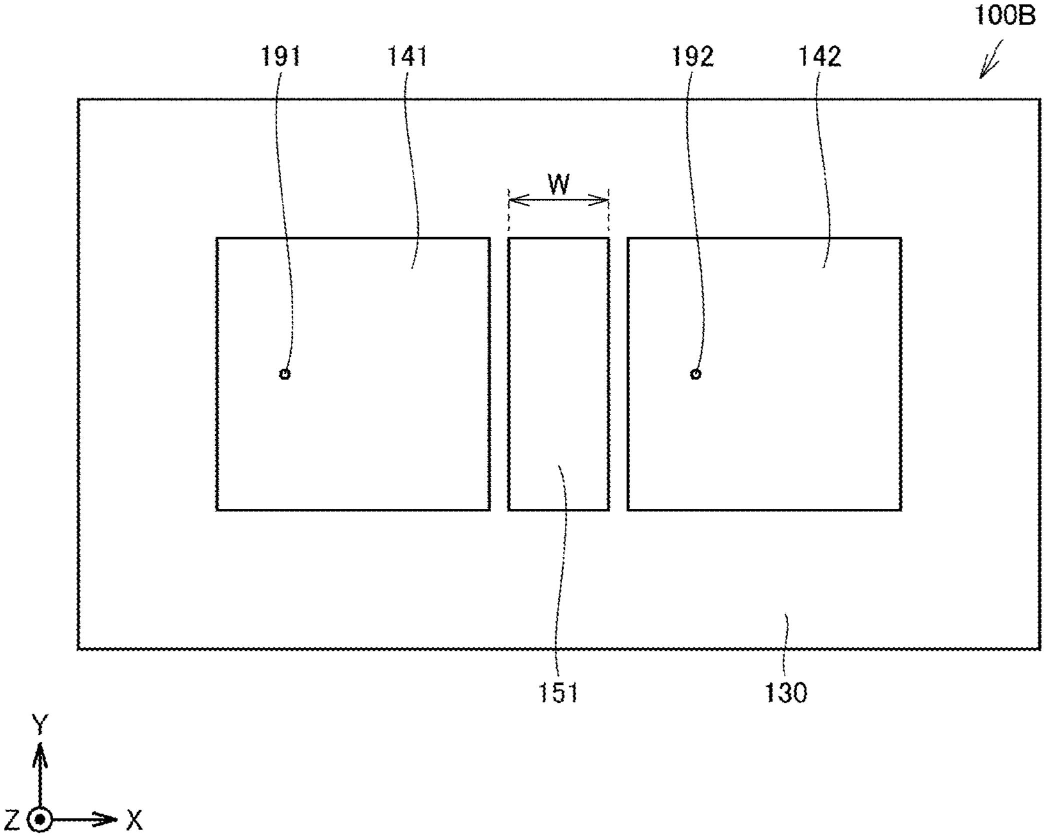

FIG. 7 illustrates part of an antenna module according to a third embodiment.

Figure 8:
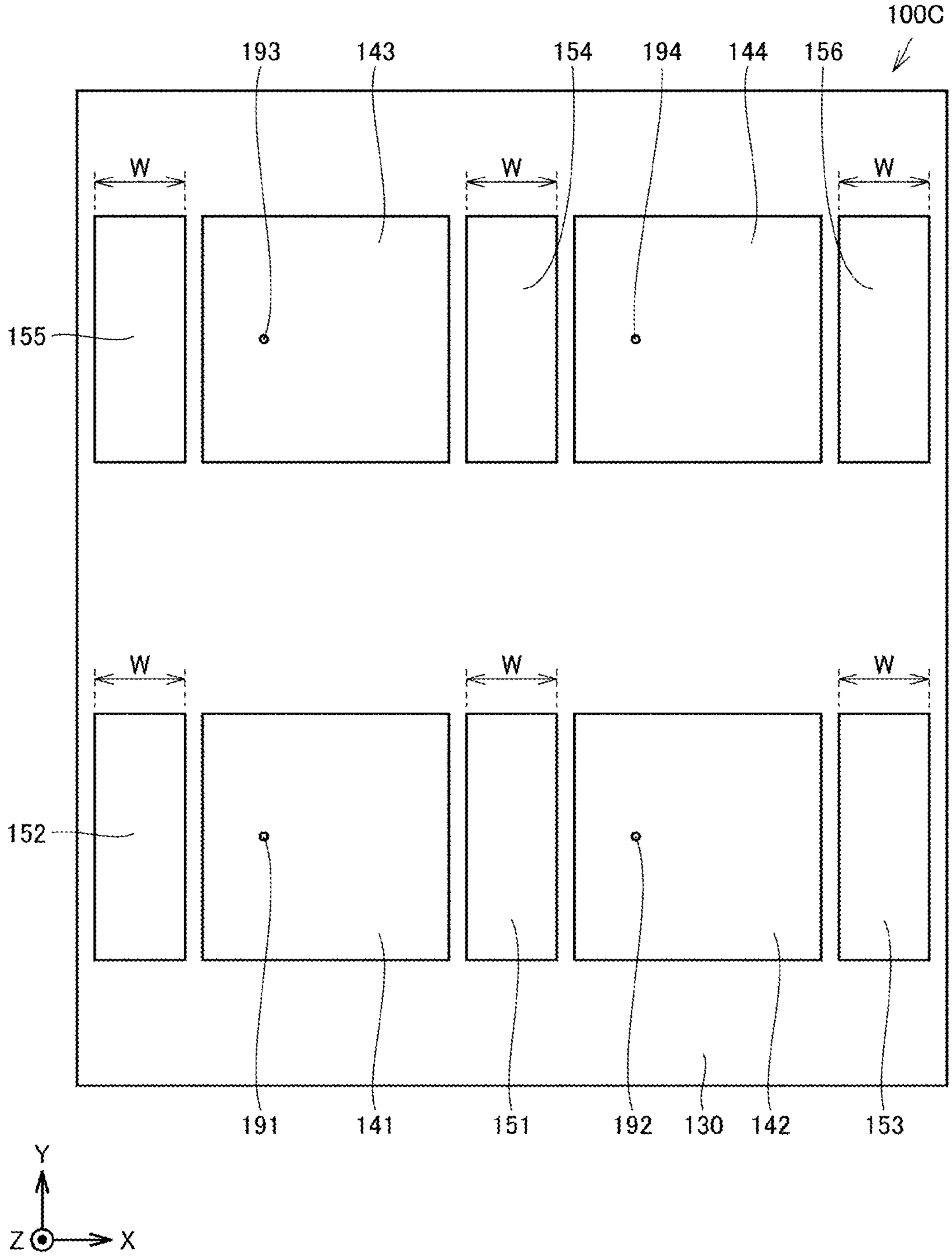

FIG. 8 illustrates part of an antenna module according to a fourth embodiment.

Figures 9A, 9B:
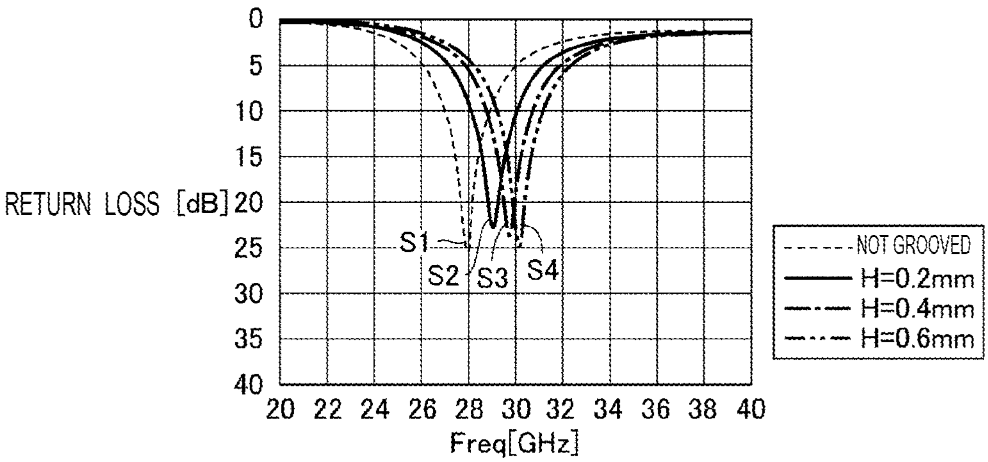

FIGS. 9A and 9B illustrate the results of simulations conducted on the antenna module according to the fourth embodiment.

Figure 10:
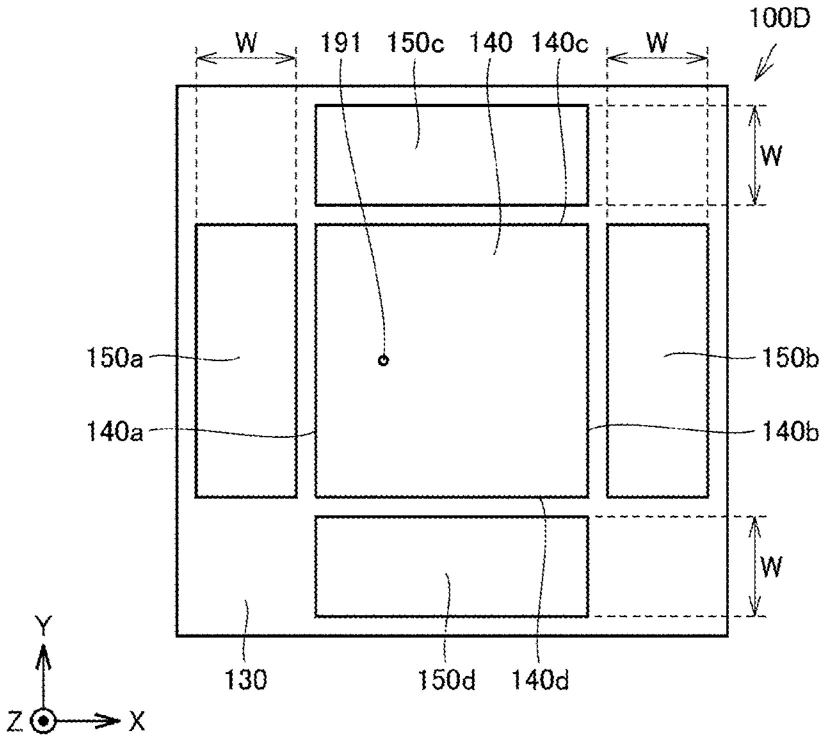

FIG. 10 illustrates part of an antenna module according to a fifth embodiment.

Figures 11A, 11B:
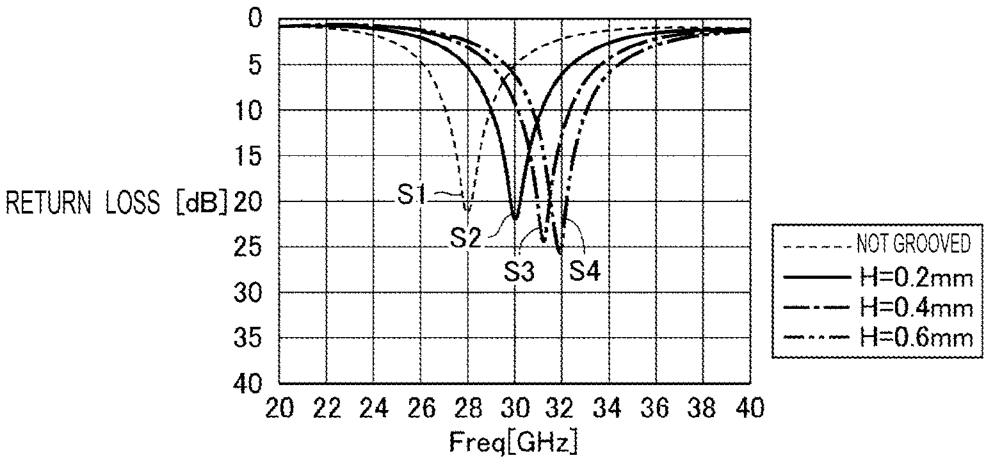

FIGS. 11A and 11B illustrate the results of simulations conducted on the antenna module according to the fifth embodiment.

Figure 12:
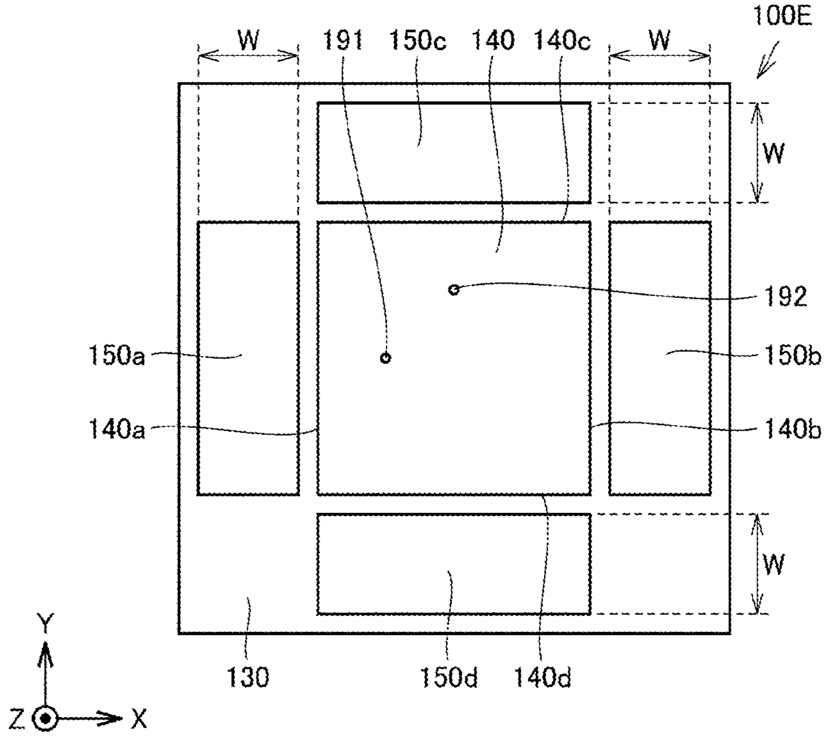

FIG. 12 illustrates part of an antenna module according to a sixth embodiment.

Figure 13A:
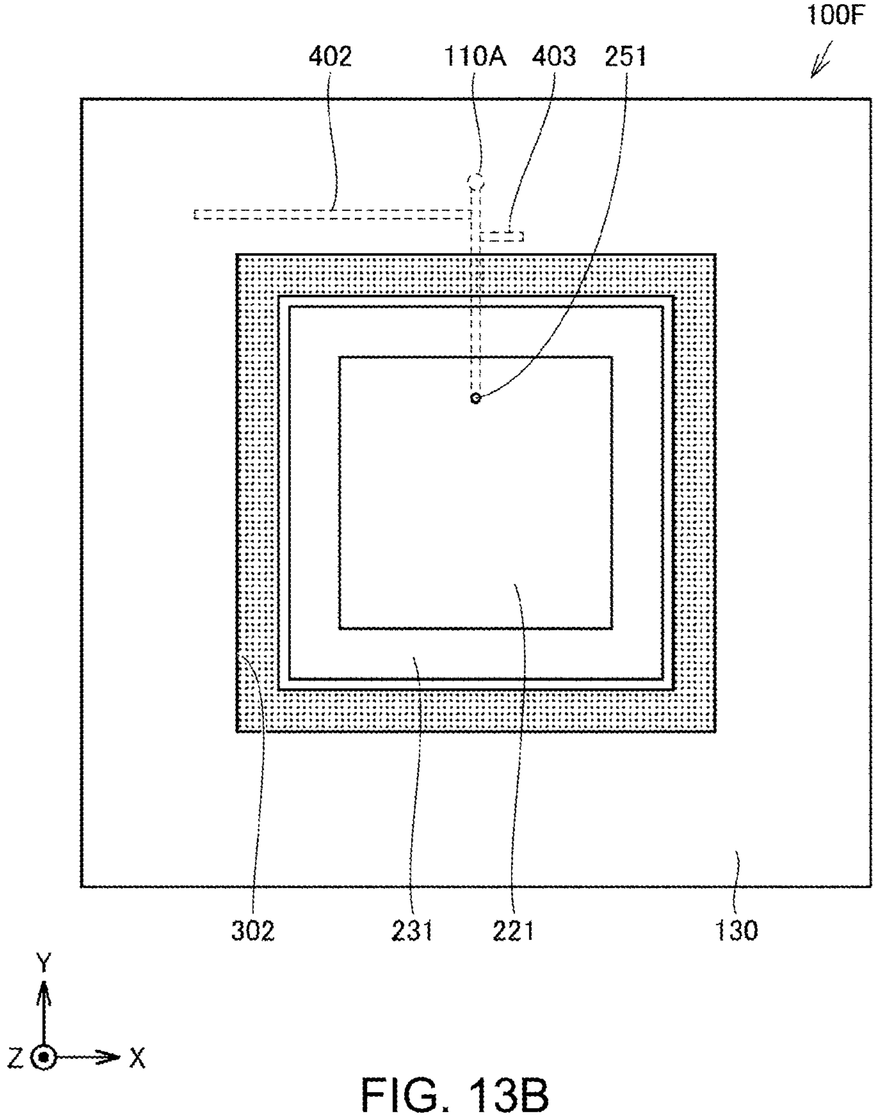
Figure 13B:
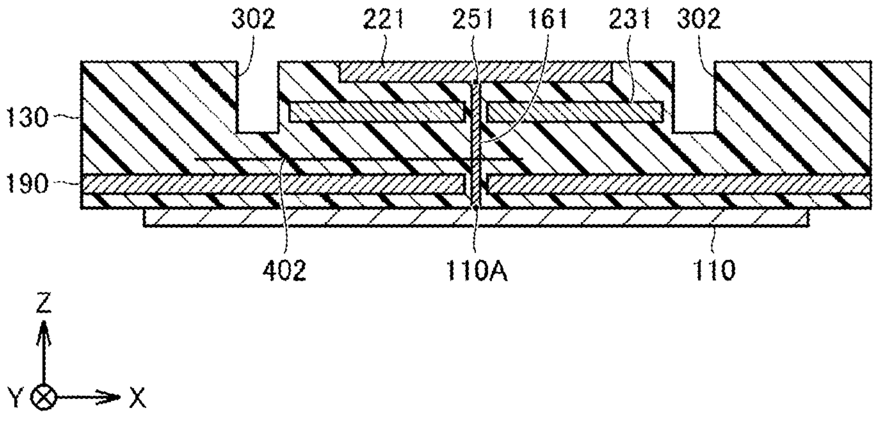

Each of FIGS. 13A and 13B illustrates part of an antenna module according to a seventh embodiment.

Figure 14:
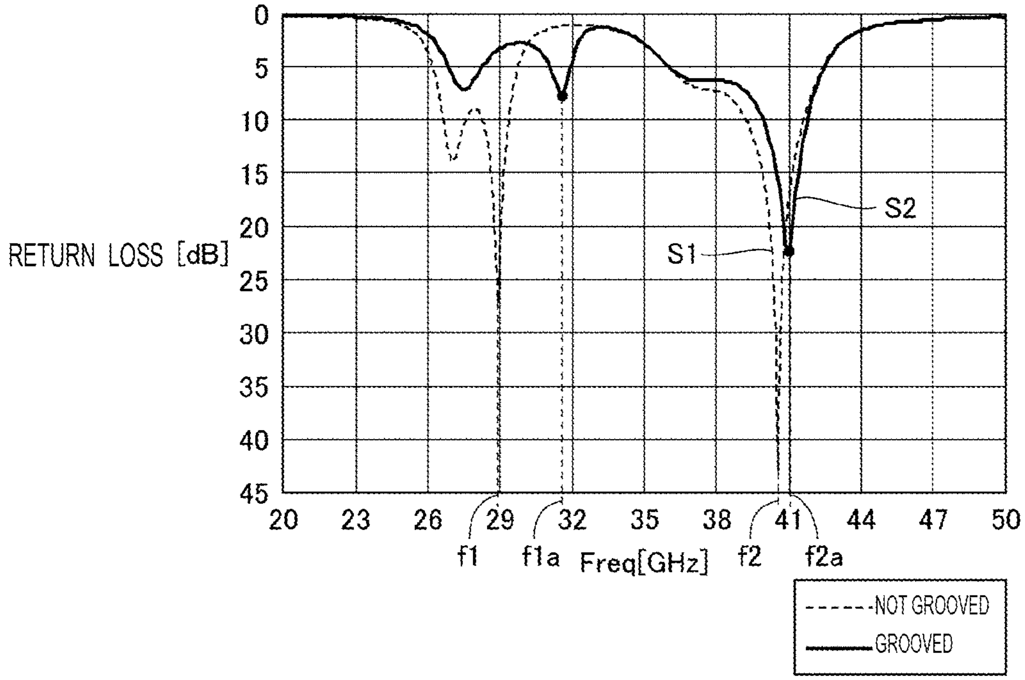

FIG. 14 illustrates the results of simulations conducted on the antenna module according to the seventh embodiment.

Figure 15A:
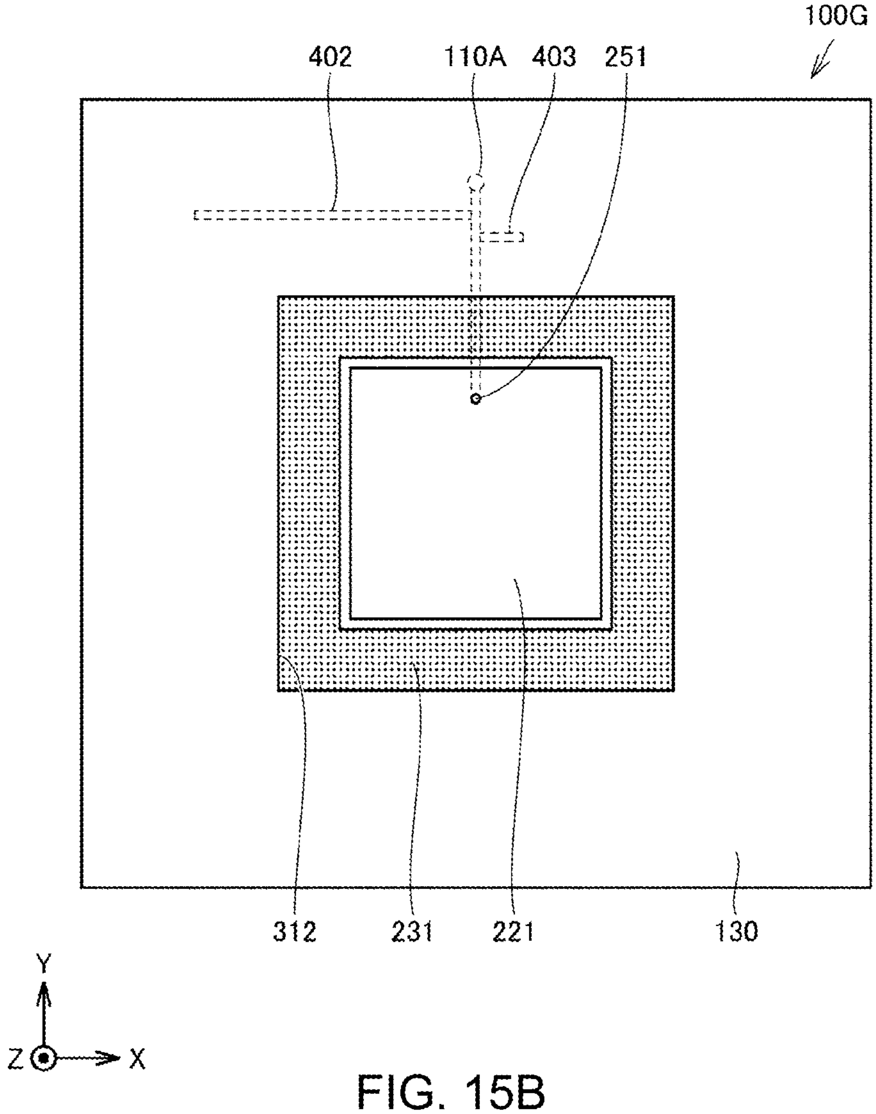
Figure 15B:
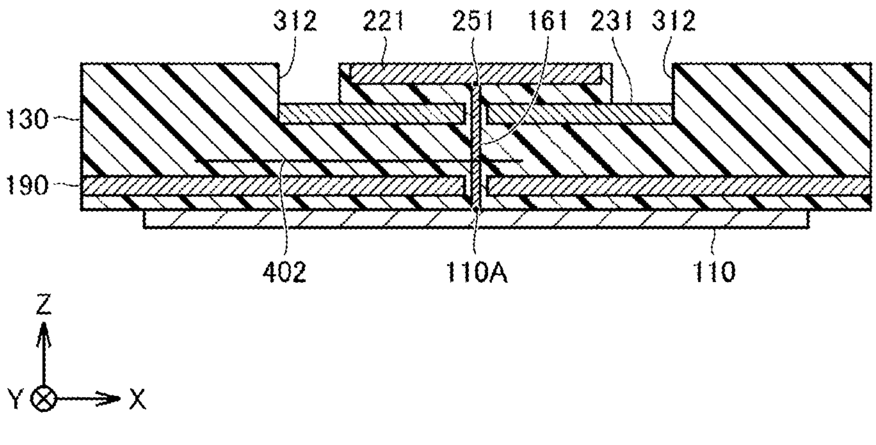

Each of FIGS. 15A and 15B illustrates part of an antenna module according to an eighth embodiment.

Figure 16:
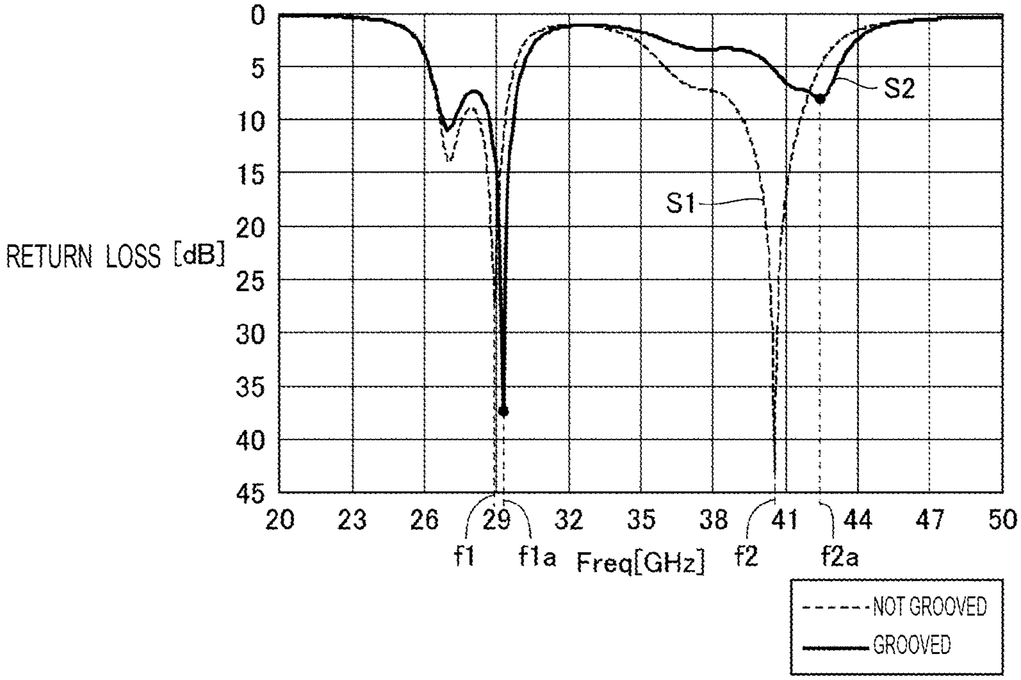

FIG. 16 illustrates the results of simulations conducted on the antenna module according to the eighth embodiment.

Figure 17A:
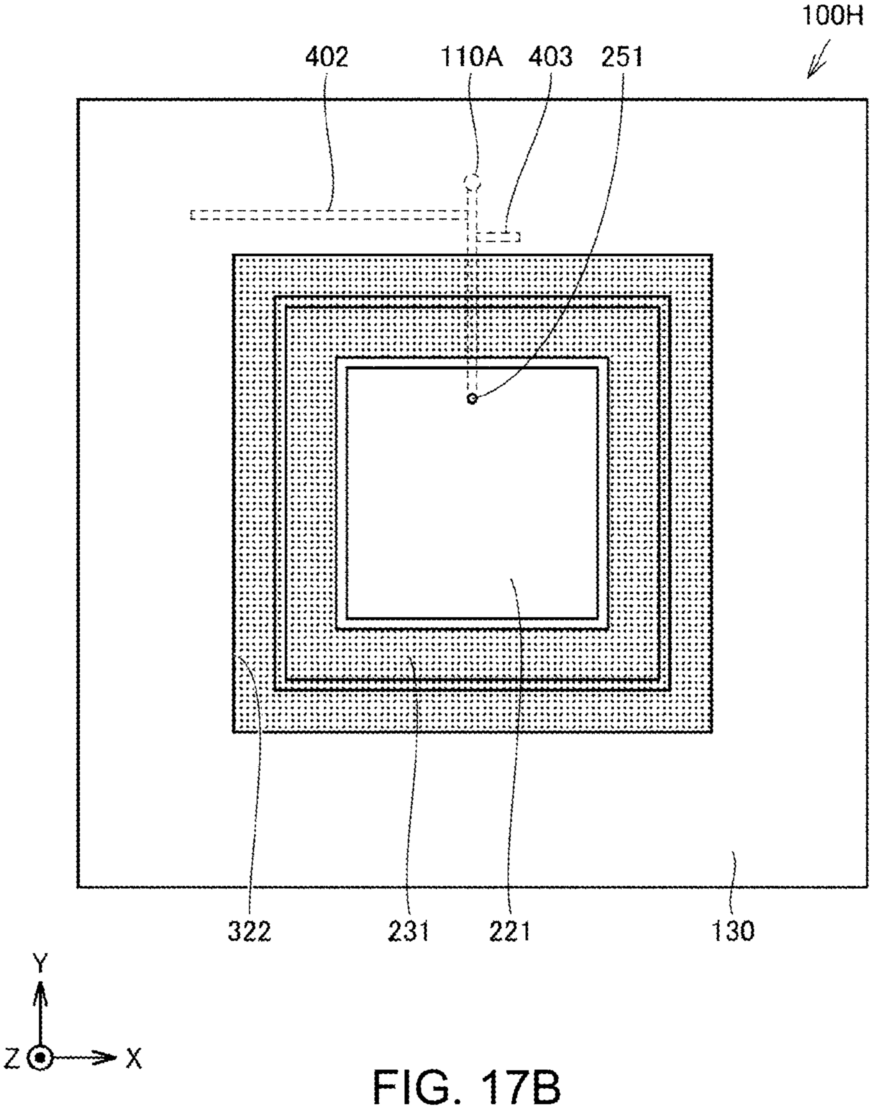
Figure 17B:
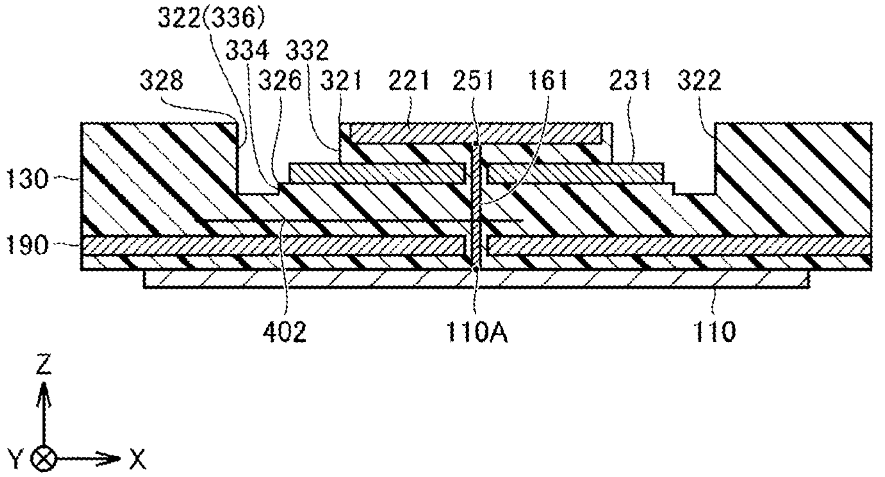

Each of FIGS. 17A and 17B illustrates part of an antenna module according to a ninth embodiment.

Figure 18:
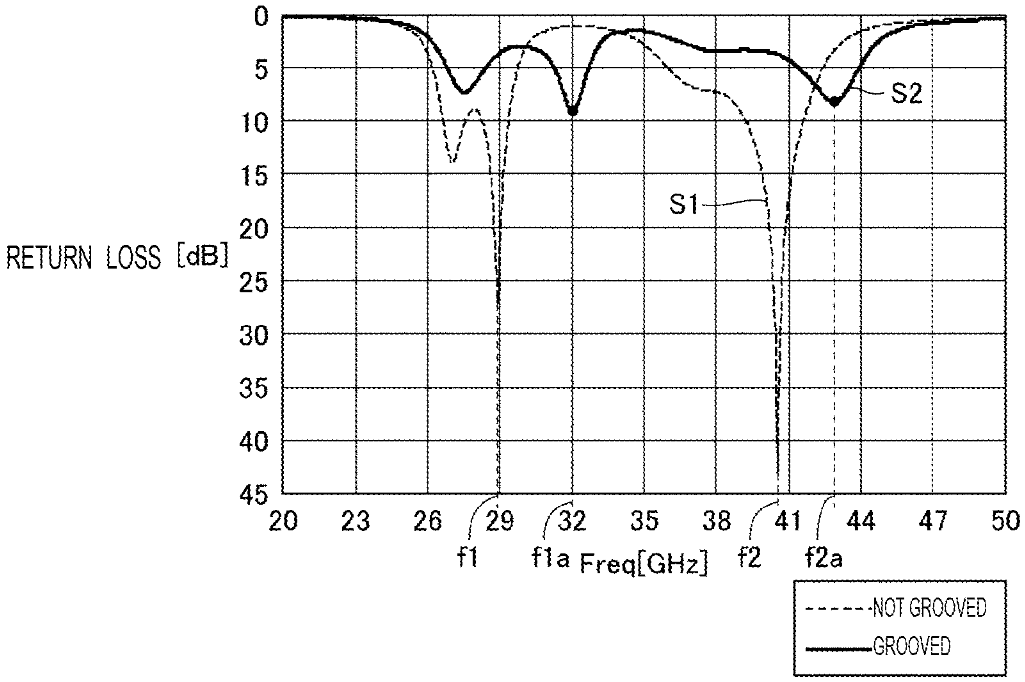

FIG. 18 illustrates the results of simulations conducted on the antenna module according to the ninth embodiment.

Figure 19A:
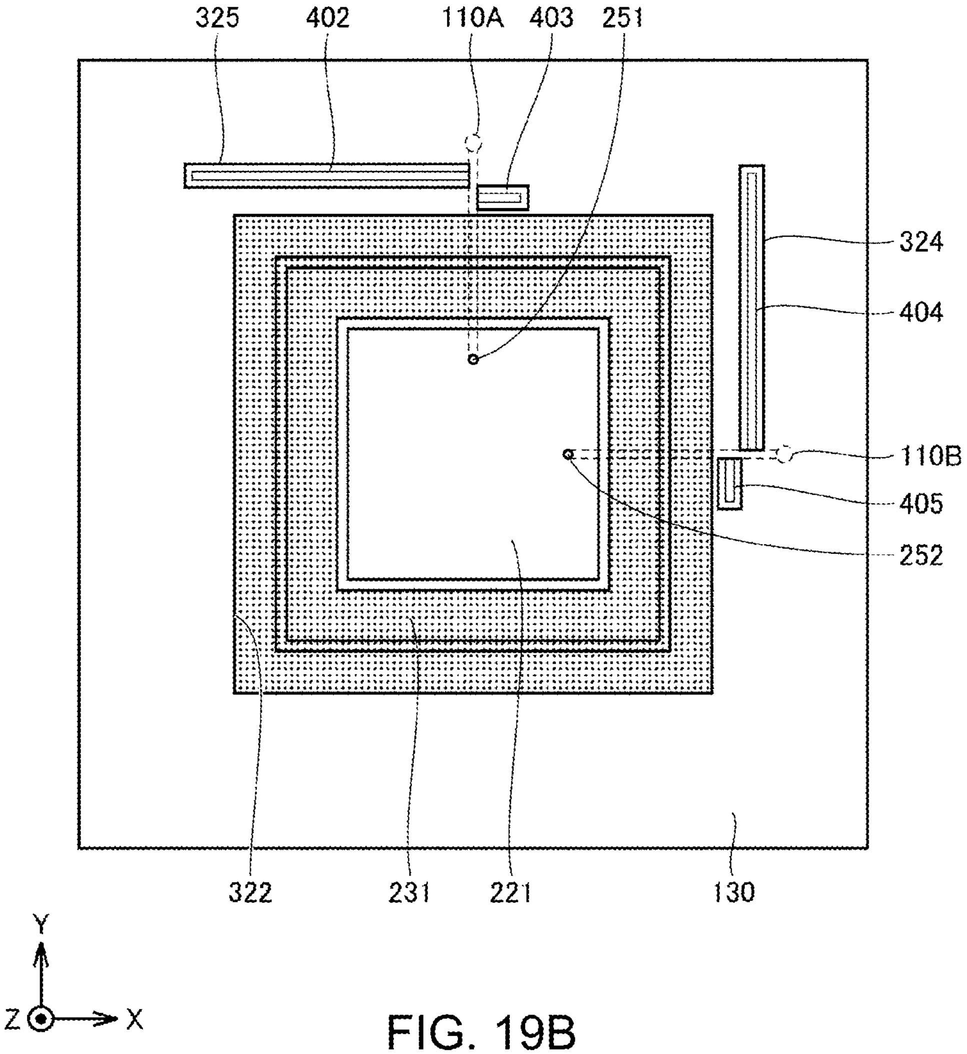
Figure 19B:
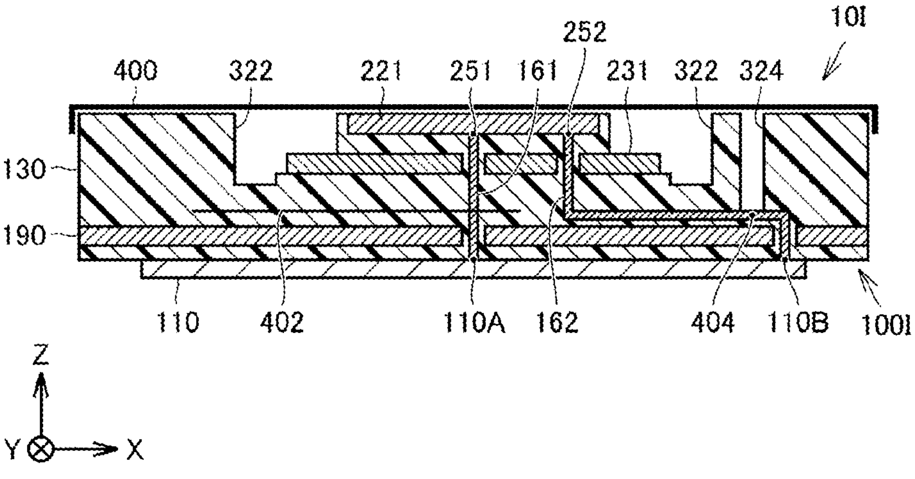

Each of FIGS. 19A and 19B illustrates part of an antenna module according to a tenth embodiment.

Figure 20:
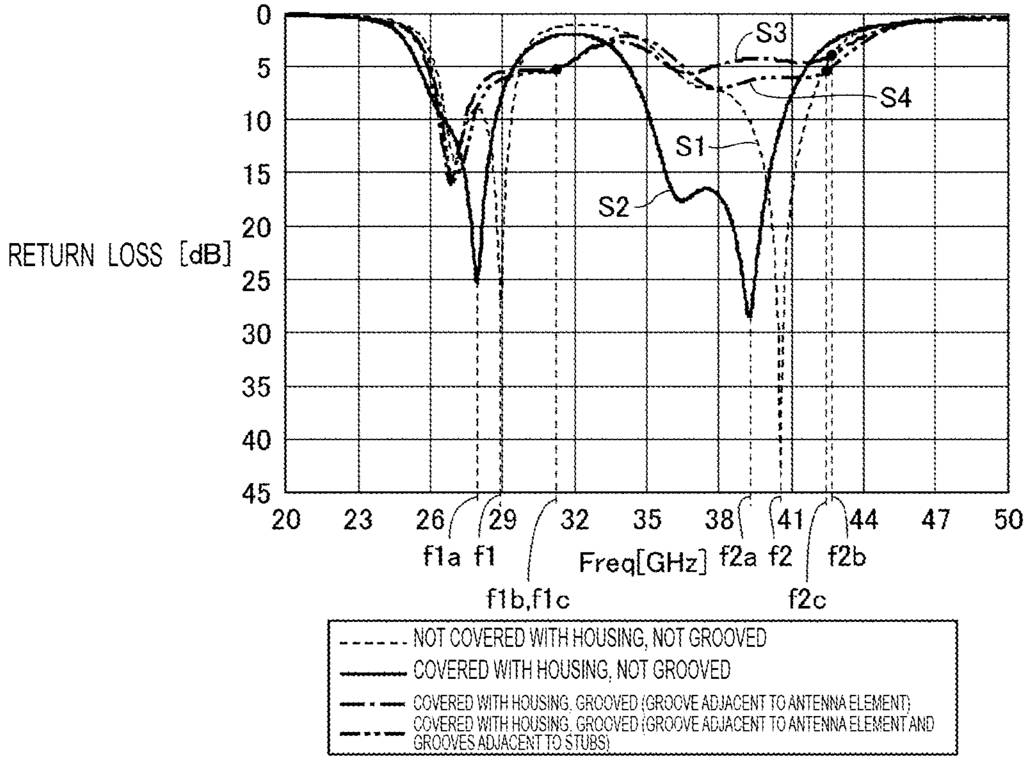

FIG. 20 illustrates the results of simulations conducted on the antenna module according to the tenth embodiment.

Figure 21A:
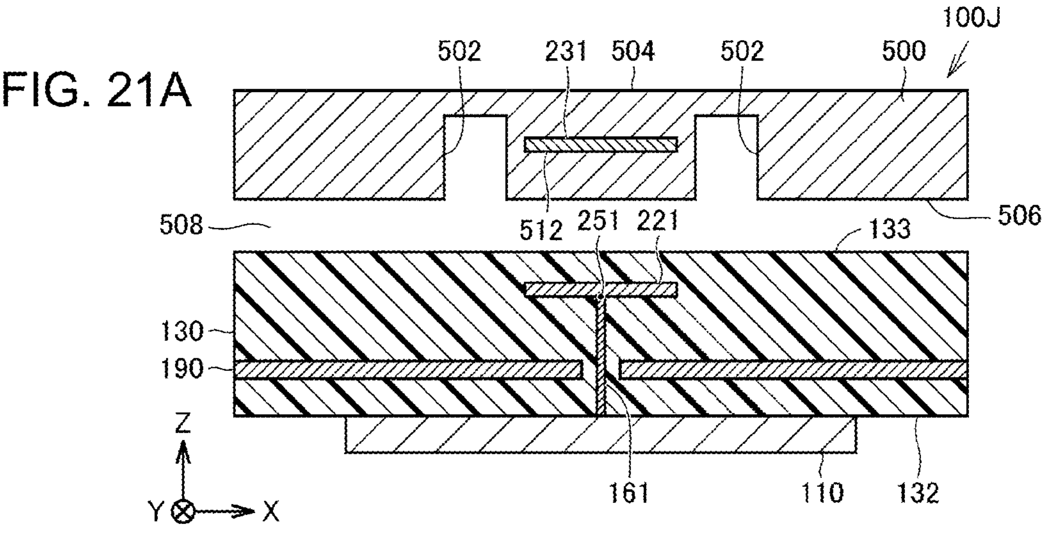
Figure 21B:
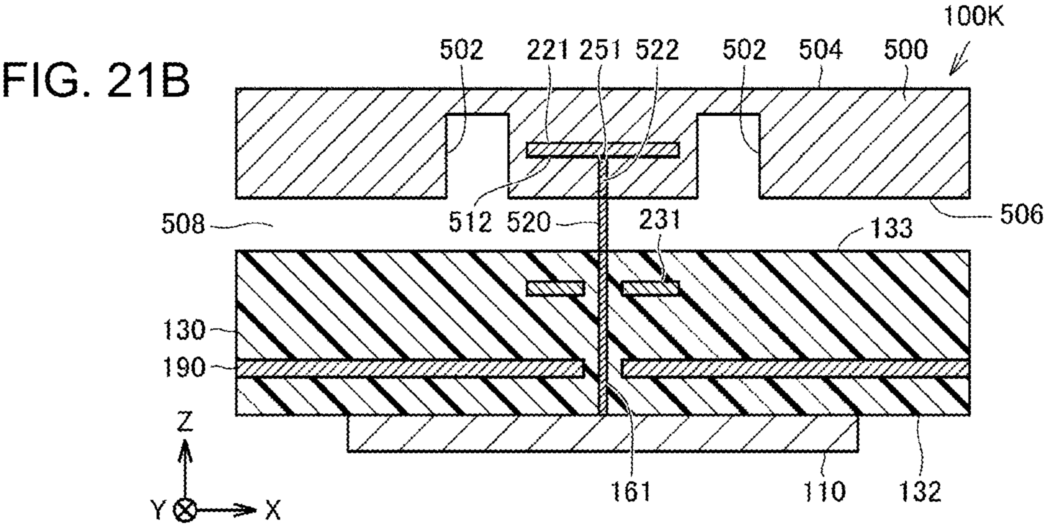
Figure 21C:
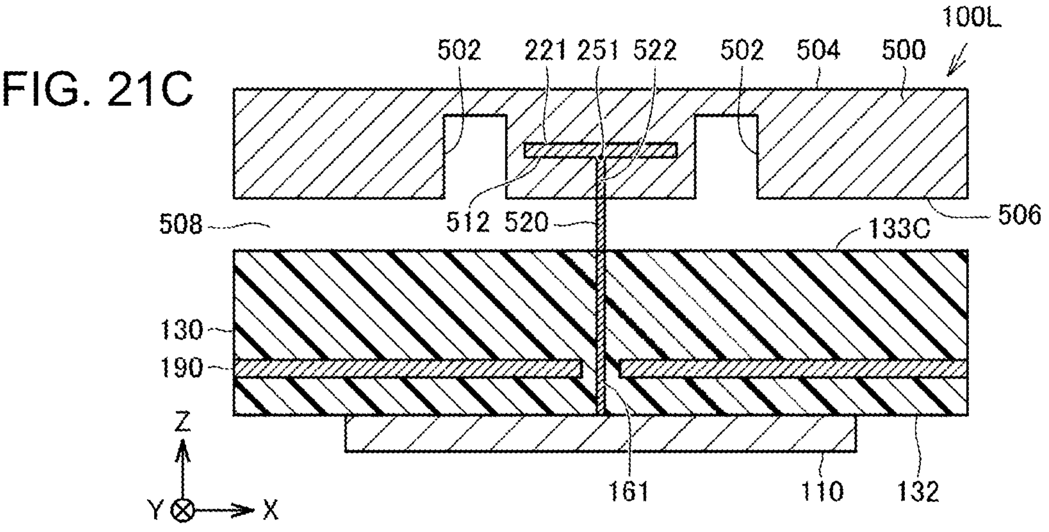

Each of FIGS. 21A, 21B and 21C illustrates part of each antenna module according to an eleventh embodiment.

Figure 22A:
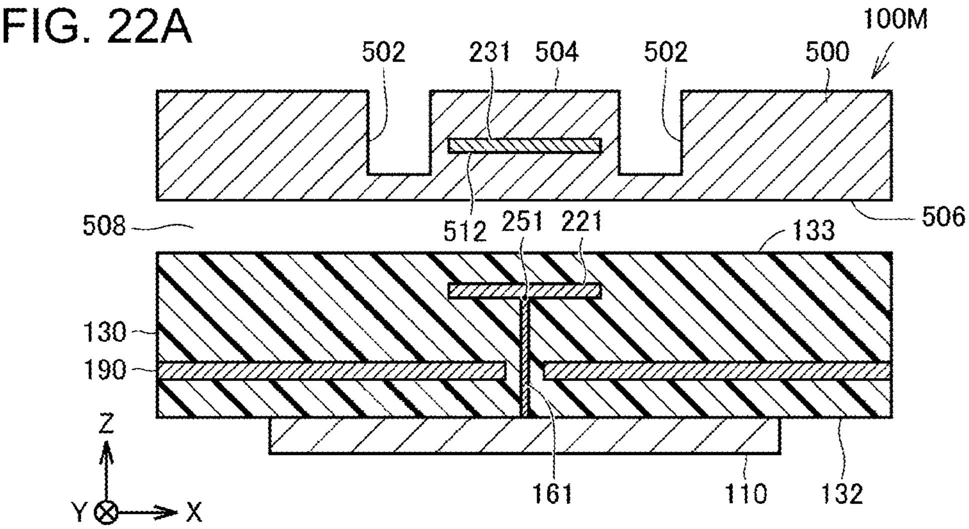
Figure 22B:
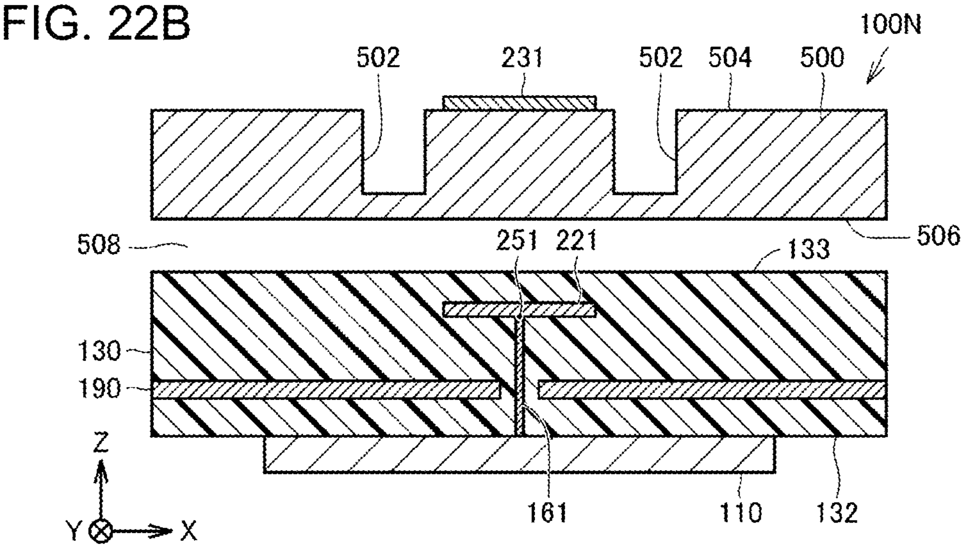

Each of FIGS. 22A and 22B illustrates part of each antenna module according to the eleventh embodiment.

Figure 23:
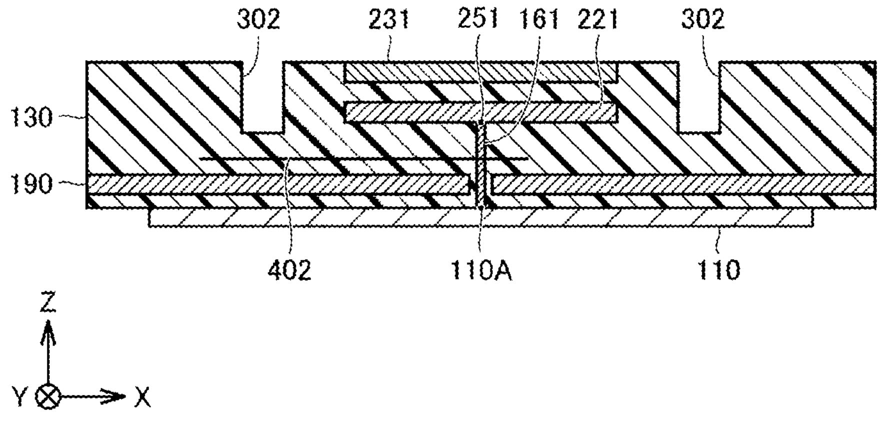

FIG. 23 illustrates part of an antenna module according to a modification.

Figure 24:
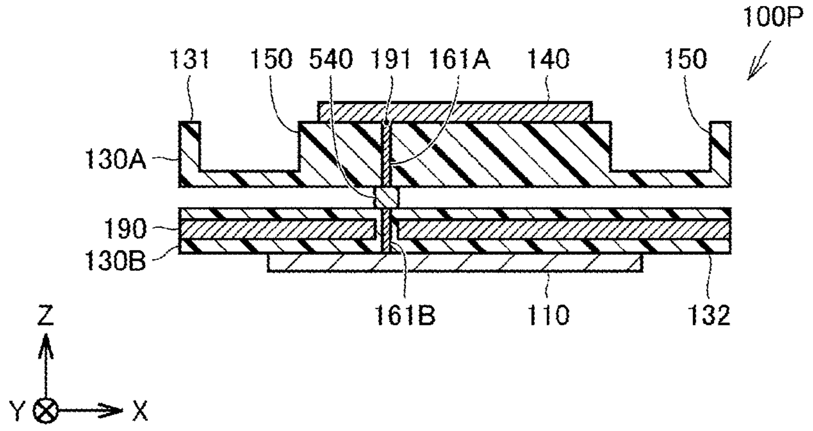

FIG. 24 illustrates part of an antenna module according to another modification.

Figure 25:
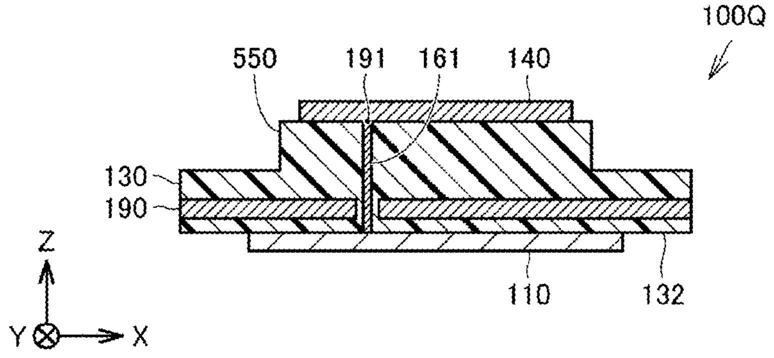

FIG. 25 illustrates part of an antenna module according to still another modification.

Figure 26:
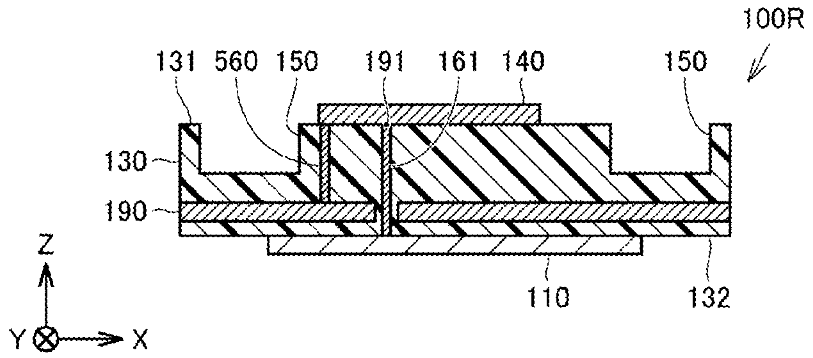

FIG. 26 illustrates part of an antenna module according to still another modification.

Figure 27:
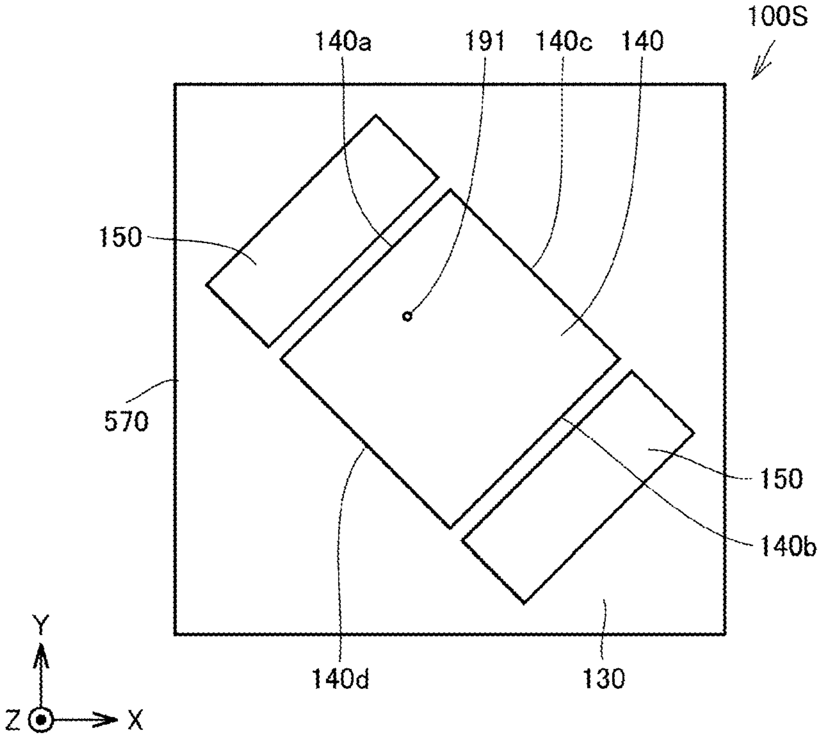

FIG. 27 illustrates part of an antenna module according to still another modification.

Figure 28:
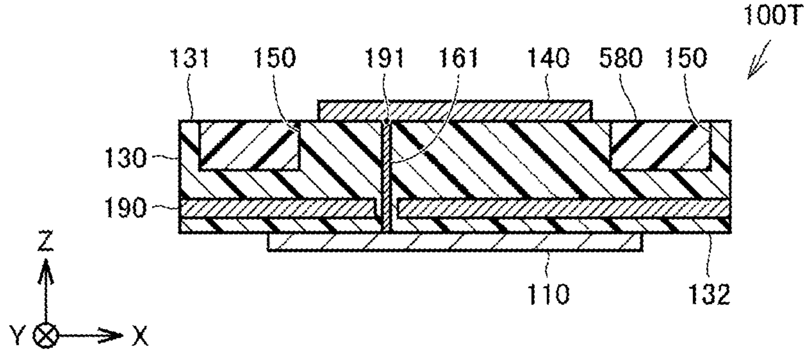

FIG. 28 illustrates part of an antenna module according to still another modification.

Figure 29:
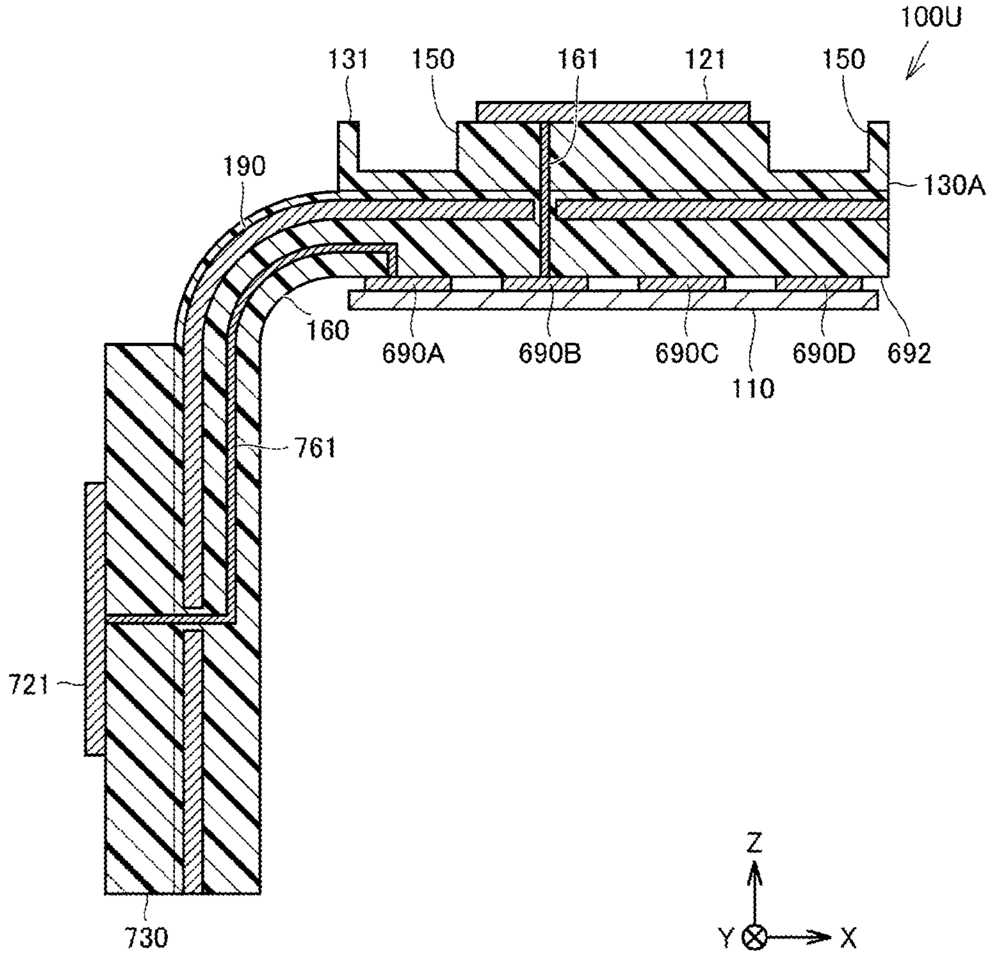

FIG. 29 illustrates part of an antenna module according to still another modification.

Figure 30:
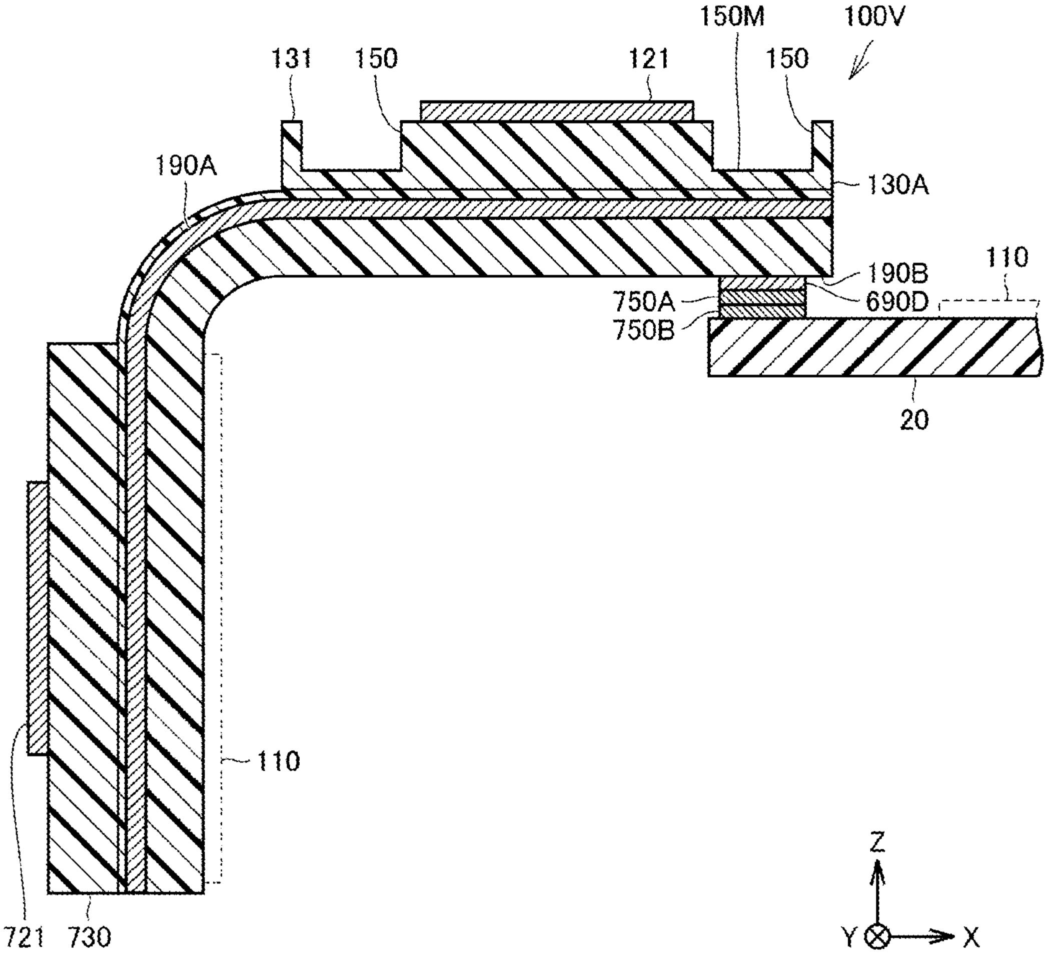

FIG. 30 illustrates part of an antenna module according to still another modification.

DETAILED DESCRIPTION OF THE DISCLOSURE

Embodiments will be described below in detail with reference to the accompanying drawings. Note that the same or like parts in the drawings are denoted by the same reference signs throughout and the redundant description thereof will be omitted.

First Embodiment

Basic Configuration of Communication Device

Figure 1:
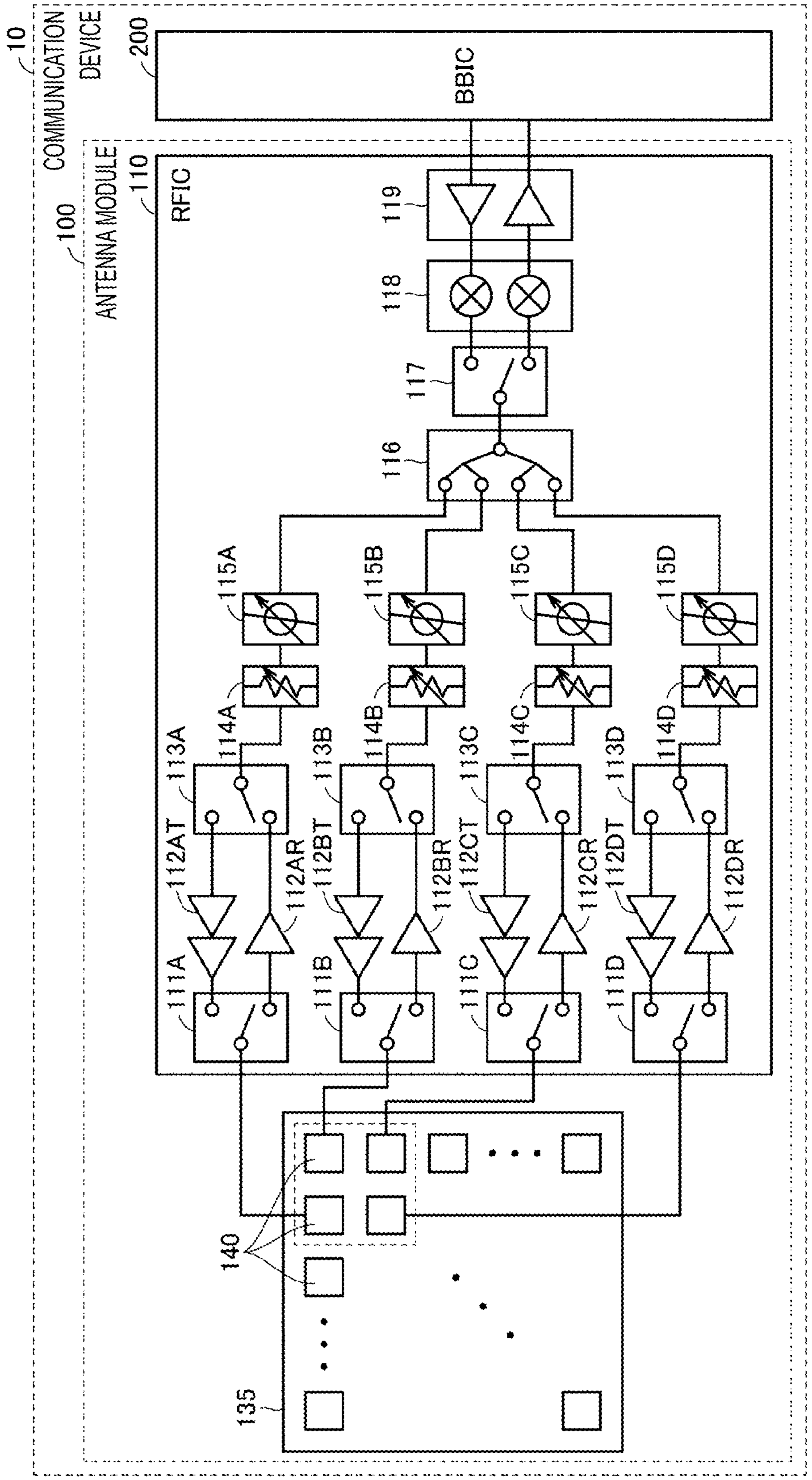
FIG. 1 is a block diagram of a communication device into which an antenna module according to an embodiment described herein is adopted.

FIG. 1 is a block diagram of a communication device 10, into which an antenna module 100 according to the present embodiment is adopted. The communication device 10 may, for example, be a mobile terminal such as a mobile phone, a smart phone, or a tablet, or may be a personal computer with communications capabilities.

Referring to FIG. 1, the communication device 10 includes the antenna module 100 and a BBIC 200, which is a baseband signal processing circuit.

The antenna module 100 includes a radio-frequency integrated circuit (RFIC) 110 and an antenna array 135. The RFIC 110 is an example of a radio-frequency circuit. The communication device 10 up-converts signals transmitted from the BBIC 200 to the antenna module 100 and radiates the resultant radio-frequency signals through the antenna array 135. The communication device 10 down-converts radio-frequency signals received through the antenna array 135, and the resultant signals are processed in the BBIC 200.

The antenna array 135 includes antenna elements. The antenna elements each include a driven element 140. Each driven elements 140 corresponds to a radiation electrode in the present disclosure. The term "radiation electrode" herein may refer not only to the driven element but also a parasitic element, which will be described later. The configurations corresponding to only four of the driven elements (radiation electrode) 140 constituting the antenna array 135 are illustrated in FIG. 1, from which the other driven elements 140 with similar configurations are omitted for easy-to-understand illustration.

The RFIC 110 includes switches 111A to 111D, switches 113A to 113D, a switch 117, power amplifiers 112AT to 112DT, low-noise amplifiers 112AR to 112DR, attenuators 114A to 114D, phase shifters 115A to 115D, a signal combiner/splitter 116, a mixer 118, and an amplifier circuit 119.

Transmission of radio-frequency signals is accomplished by switching the switches 111A to 111D and the switches 113A to 113D to their respective positions for connections with the power amplifiers 112AT to 112DT and by connecting the switch 117 to a transmitting amplifier included in the amplifier circuit 119. Reception of radio-frequency signals is accomplished by switching the switches 111A to 111D and the switches 113A to 113D to their respective positions for connections with the low-noise amplifiers 112AR to 112DR and by connecting the switch 117 to a receiving amplifier included in the amplifier circuit 119.

Signals transmitted from the BBIC 200 are amplified in the amplifier circuit 119 and are then up-converted in the mixer 118. Transmission signals, namely, up-converted radio-frequency signals are each split into four waves by the signal combiner/splitter 116. The four waves flow through four respective signal paths and are fed to different driven elements 140. The phase shifters 115A to 115D disposed on the respective signal paths provide individually adjusted degrees of phase shift, and the directivity of the antenna array 135 is adjusted accordingly.

Reception signals, namely, radio-frequency signals received by the driven elements 140 pass through four different signal paths and are combined by the signal combiner/splitter 116. The combined reception signals are down-converted in the mixer 118, are amplified in the amplifier circuit 119, and are then transmitted to the BBIC 200.

The RFIC 110 is provided as, for example, a one-chip integrated circuit component having the aforementioned circuit configuration. Alternatively, the RFIC 110 may include one-chip integrated circuit components, each of which is provided for the corresponding one of the driven elements 140 and is constructed of switches, a power amplifier, a low-noise amplifier, an attenuator, and a phase shifter.

Configuration of Antenna Module

Each of FIGS. 2A and 2B illustrates an antenna module 100 according to a first embodiment. More specifically, each of FIGS. 2A and 2B illustrates a portion including a feed line forming a connection between the RFIC 110 and the corresponding driven element 140 in FIG. 1.

The antenna module 100 includes the driven element 140, a feed line 161, a dielectric substrate 130, and a ground conductor 190 (GND), which faces the driven element 140. The dielectric substrate 130 corresponds to a dielectric member in the present disclosure. The ground conductor 190 corresponds to a ground electrode in the present disclosure.

The dielectric substrate 130 has a multilayer structure. The dielectric substrate 130 typically includes resin layers stacked on top of one another. The dielectric substrate 130 may, for example, be a low-temperature co-fired ceramic (LTCC) substrate. Substrates that may be used as the dielectric substrate 130 include: a multilayer resin substrate including epoxy resin layers, polyimide resin layers, or other resin layers stacked on top of one another; a multilayer resin substrate including resin layers made from liquid crystal polymer (LCP) of lower dielectric constant and stacked on top of one another; a multilayer resin substrate including fluororesin layers stacked on top of one another; and ceramic multilayer substrates other than the LTCC multilayer substrates.

The direction in which the layers constituting the dielectric substrate 130 are stacked on top of one another coincides with the direction of the Z axis in the drawings relevant to the present embodiment. The X axis and the Y axis are orthogonal to the Z axis.

FIG. 2A illustrates the dielectric substrate 130 viewed in plan in the direction of the Z axis. FIG. 2B is a sectional view taken along a plane passing through a feed point 191.

The driven element 140 is disposed on a placement surface 131. The driven element 140 in the present embodiment is rectangular when viewed in plan in the direction of the Z axis. The placement surface 131 is one of two surfaces of the dielectric substrate 130. The other surface opposite to the placement surface 131 in the direction of the Z axis is a mounting surface 132, on which the RFIC 110 is mounted with a connection electrode such as a solder bump (not illustrated) being disposed between the mounting surface 132 and the RFIC 110.

One end of the feed line 161 is connected to the feed point 191 of the driven element 140. The other end of the feed line 161 is connected to the RFIC 110. The feed line 161 extends through the ground conductor 190. Radio-frequency signals are transmitted from the RFIC 110 to the driven element 140 through the feed line 161. Radio-frequency signals received by the driven element are transmitted to the RFIC 110 through the feed line 161. Conductors that are formed into, for example, the driven element 140 and the feed line 161 are made of aluminum (Al), copper (Cu), gold (Au), silver (Ag), or an alloy containing these metals as a principal component.

Referring to FIGS. 2A and 2B, the ground conductor 190 is disposed on a layer different from a layer on which the placement surface 131 is located. The ground conductor 190 is disposed between the mounting surface 132 and the driven element 140 (the placement surface 131).

In the present embodiment, grooves 150 are provided. Referring to FIG. 2A, which illustrates the antenna module 100 viewed in plan in the direction of the Z axis, the grooves 150 are adjacent to the driven element 140 and separate from the driven element 140. The grooves 150 are provided in the placement surface 131. The grooves 150 extend toward the ground conductor 190 from the site in which the grooves 150 are provided in a manner so as to be separate from the driven element 140. The grooves 150 are rectangular when the antenna module 100 is viewed in the direction of the Z axis; that is, the grooves 150 viewed in plan in the direction of the Z axis are rectangular.

As illustrated in FIG. 2A, the feed point 191 is off-center, or more specifically, is shifted out of the center of the driven element 140 to the negative side in the direction of the X axis. Radio-frequency signals radiated from the driven element 140 are polarized in the direction of the X axis accordingly. The polarization direction that coincides with the direction of the X axis corresponds to a first polarization direction in the present disclosure.

Referring to FIG. 2A, two grooves 150 are provided. The two grooves 150 in FIG. 2A extend along the sides of the driven element 140 that extend in a direction (of the Y axis) orthogonal to the first polarization direction (i.e., orthogonal to the direction of the X axis); that is, the two grooves 150 face a side 140*a* and a side 140*b*, respectively. The two grooves 150 are arranged symmetrically about the driven element 140.

FIG. 3 is an enlarged view of the driven element 140 and the grooves 150 in FIG. 2B. Referring to FIG. 3, L denotes the distance between each groove 150 and the driven element 140, H denotes the depth of each groove 150 in the direction of the Z axis, and W denotes the width of each groove 150 in the direction of the X axis. The distance L is equal to or more than 10 μm and equal to or less than $\lambda/2$, where $\lambda$ is the wavelength of a radio-frequency signal radiated from the driven element 140.

FIGS. 4A and 4B illustrate the antenna characteristics exhibited through simulations conducted on the antenna module according to the present embodiment, with variations in the depth of the grooves 150. FIG. 4A illustrates the changes in the return loss of the antenna element. In FIG. 4A, the vertical axis represents the return loss, and the horizontal axis represents the frequency. The frequency at which the return loss illustrated in FIG. 4A is minimized is hereinafter referred to as a resonant frequency f0.

The result of a simulation conducted on an antenna module in which the grooves 150 are not provided is denoted by a broken line S1 in FIG. 4A, with the resonant frequency at 27.9 GHz. The result of a simulation conducted on an antenna module in which the grooves 150 are each 1 mm in width and 0.2 mm in depth (H=0.2 mm) is denoted by a solid line S2, with the resonant frequency at 29.4 GHz. The result of a simulation conducted on an antenna module in which the grooves 150 are each 1 mm in width and 0.4 mm in depth (H=0.4 mm) is denoted by a dash-dot line S3, with the resonant frequency at 30.2 GHz. The result of a simulation conducted on an antenna module in which the grooves 150 are each 1 mm in width and 0.6 mm in depth (H=0.6 mm) is denoted by a dash-dot-dot line S4, with the resonant frequency at 30.7 GHz.

FIG. 4B illustrates the relationship between the resonant frequency f0 and the depth H of the grooves 150. In the table shown in FIG. 4B, fields for W (width)=0 and the H (depth)=0 indicate that the grooves are not provided.

BW in FIG. 4B denotes a frequency bandwidth in which the return loss is less than a predetermined value (e.g., 6 dB). As can be seen from FIG. 4B, there is not much correlation between the frequency bandwidth BW and the depth H of the grooves 150.

The terms in FIGS. 4A and 4B are also used in FIGS. 6A and 6B, 9A and 9B, and 11A and 11B, which will be described later with no mention of the definition of each of these terms.

It can be seen from FIGS. 4A and 4B that the resonant frequency is higher for the antenna element in which the depth H of the grooves 150 is greater. This means that f0 is adjustable by the changes in the depth H of the grooves 150.

In designing an antenna module, the type of housing that is to be fitted over the antenna module is specified, and the resonant frequency deviation for the relevant type of housing is then be determined. The grooves 150 whose depth H corresponds with the amount of resonant frequency shift as great as is necessary to correct the deviation are provided in the placement surface 131. That is, the grooves 150 have a depth conforming to the type of the housing.

Conventional antenna modules are covered with a housing for adoption into a communication device. With the housing being fitted over the antenna module, the parasitic capacitance of the housing can cause the resonant frequency of the driven element to vary. The variations in resonant frequency give rise to a loss of strength of radio-frequency signals radiated from the driven element.

The resonant frequency deviation is typically fixed for each type of housing that is to be fitted over the antenna module concerned. In designing the antenna module according to the present embodiment, the type of housing that is to be fitted over the antenna module is specified, and the resonant frequency deviation for the type of housing is then determined. The grooves 150 whose depth H corresponds with the amount of resonant frequency shift as great as is necessary to correct the deviation are provided in the placement surface 131. As described above with reference to, for example, FIGS. 4A and 4B, the resonant frequency of the driven element is changeable. More specifically, the (effective) dielectric constant of the portion between the driven element 140 and the ground conductor 190 is adjustable due to the presence of the grooves 150. The resonant frequency deviation associated with the housing that is to be fitted over the antenna module is corrected accordingly. The present embodiment is thus conducive to reducing the loss of strength of the radio-frequency signal radiated from the driven element of the antenna module covered with a housing.

As an alternative to the approach mentioned above, at least one of the distance L and the width W of the grooves may be adjusted in such a way as to correspond with the amount of resonant frequency shift as great as is necessary to correct the resonant frequency deviation associated with the housing fitted over the antenna module.

The resonant frequency is higher for the antenna element in which the depth H of the grooves 150 is greater. The reason for this is as follows. Electric lines of force extend between the driven element 140 and the ground conductor 190 such that Equations (1) and (2) hold for the part illustrated in FIG. 2B. Substituting Equation (2) to Equation (1) yields Equation (3).

$$f0 = \frac{1}{2\pi\sqrt{LC}} \tag{1}$$

$$C = \frac{\varepsilon r \cdot S}{d} \tag{2}$$

$$f0 = \frac{1}{2\pi\sqrt{L \cdot \frac{\varepsilon r \cdot S}{d}}} \tag{3}$$

In these equations, L denotes reactance, C denotes capacitance, εr denotes the (effective) dielectric constant of the portion between the driven element 140 and the ground conductor 190, S denotes the area of the driven element 140 viewed in plan in the direction of the Z axis, and d denotes the distance between the driven element 140 and the ground conductor 190.

As can be seen from Equation (3), the resonant frequency f0 of the driven element 140 is inversely proportional to the square root of the (effective) dielectric constant (εr) of the portion between the driven element 140 and the ground conductor 190. That is, as the effective dielectric constant εr decreases, the resonant frequency f0 increases.

In the present embodiment, the dielectric substrate 130 has the grooves 150. The dielectric constant (ε1) in the air gaps defined by the respective grooves 150 is lower than the dielectric constant (ε2) of the dielectric substrate 130. The presence of the grooves 150 thus leads to a reduction in the effective dielectric constant εr, and the resonant frequency f0 of the driven element 140 increases correspondingly. The grooves 150 are provided in sites where the density of electric lines of force extending between the driven element 140 and the ground conductor 190 is high. The amount of shift in the resonant frequency f0 in the present embodiment is greater than the amount of shift in the resonant frequency f0 for the case in which the grooves are provided in sites where the density of the electric lines of force is low.

As the depth H of the grooves 150 becomes greater, the proportion of the air gaps becomes higher, which leads to a decrease in the effective dielectric constant in the sites where the grooves 150 are provided. This means that as the depth H of the grooves 150 becomes greater, the amount of shift in the resonant frequency f0 increases correspondingly.

As described above, radio-frequency signals radiated from the driven element 140 are polarized in the direction of the X axis. This produces nonuniformity in the density of electric lines of force extending between the driven element 140 and the ground conductor 190. More specifically, the density of electric lines of force from edges (the side 140*a* and the side 140*b*) of the driven element 140 that extend along the X axis is higher than the density of electric lines of force from edges (a side 140*c* and a side 140*d*) of the driven element 140 that extend along the Y axis. In the present embodiment, the driven element 140 is adjacent to two grooves 150, each of which faces the corresponding one of the edges (the sides 140*a* and 140*b*) located on the respective sides in the direction of X axis, that is, in the direction in which the density of the electric lines of force is higher (i.e., in the polarization of radio-frequency signals radiated from the driven element 140). In other words, each of the two grooves 150 extends along the corresponding one of the sides 140*a* and 140*b*, which are two of the four sides of the driven element 140 and extend in the direction orthogonal to the polarization direction (i.e., in the direction of the Y axis). The correlation between the resonant frequency f0 and the presence of grooves is higher in the antenna module according to the present embodiment than in an antenna module in which two grooves extend along the sides 140*c* and 140*d*, which extend along the polarization direction (i.e., the direction of the X axis). The amount of shift in the resonant frequency is thus greater in the antenna module according to the present embodiment than in the antenna module in which two grooves extend along the sides 140*c* and 140*d*, which extend along the polarization direction (i.e., the direction of the X axis).

If the two grooves 150 are arranged asymmetrically about the driven element 140, the effective dielectric constant in one of the two grooves 150 would not be equal to the effective dielectric constant in the other groove 150, leading to a decrease in the degree of symmetry of the antenna module.

It is therefore preferred that the two grooves 150 be arranged symmetrically about the driven element 140 of the antenna module according to the present embodiment. More specifically, the two grooves 150 are preferably identical in terms of the distance L from the driven element 140, the depth H, and the plan-view shape. For this reason, the two grooves 150 are shaped in a manner so as to be mirror images of each other with respect to the driven element 140. With the two grooves 150 being mirror images of each other with respect to the driven element 140, the symmetry of the antenna module is ensured.

As another approach to changing the resonant frequency f0, the driven element 140 may be trimmed. The downside of trimming the driven element 140 is that the amount of shift in the resonant frequency f0 can be so high that it is difficult to adjust the resonant frequency f0. Trimming the driven element 140 has a direct impact on parameters of the driven element 140, through which current flows. This is the reason why the amount of shift in the resonant frequency f0 can be unduly great.

This problem can be averted by the present embodiment, in which the driven element 140 is not trimmed and the grooves 150 are separate from the driven element 140 when the antenna module 100 is viewed in plan. The present embodiment thus eliminates or reduces the possibility that the amount of shift in the resonant frequency f0 will be unduly great. Thus, fine adjustments of the resonant frequency f0 will be made in an appropriate manner.

The distance L is equal to or more than 10 μm as mentioned above. The reason for this is as follows. With the given degree of accuracy in the process of producing the antenna module 100, the driven element 140 would be likely to be accidentally trimmed in the process of producing the antenna module 100 if the distance L is too short, or more specifically, if the distance L is less than 10 μm. To work around this problem, the distance L in the present embodiment is equal to or more than 10 μm. The driven element 140 will thus be kept, to the extent possible, from being trimmed.

The electric field intensity represented by the electric lines of force extending between the driven element and the ground conductor typically decreases with increasing distance from the driven element concerned. In the case that the grooves 150 are too far away from the driven element 140, that is, the distance L (see FIG. 3) is too long, the density of the electric lines of force in sites where the grooves 150 are provided is low. In this case, the amount of shift in the resonant frequency f0 will be small, or the resonant frequency f0 will not change despite the presence of the grooves 150. This problem can be averted by the present embodiment, in which the distance L is equal to or more than 10 μm and equal to or less than λ/2. The density of the electric lines of force in sites where the grooves 150 are provided is high. The resonant frequency f0 will thus be shifted in an appropriate manner.

In the first embodiment, the grooves 150 are provided in such a way as not to impair the antenna characteristics of the antenna module. For example, it is only required that the grooves 150 be provided in at least one of the driven elements 140.

Second Embodiment

An antenna module 100A according to the second embodiment includes an array of driven elements. More specifically, the antenna module according to the present embodiment includes a one-by-two array of driven elements. The two driven elements are each located between grooves.

FIG. 5A illustrates a dielectric substrate 130 included in the antenna module 100A according to the second embodiment and viewed in plan in the direction of the Z axis. FIG. 5B is a sectional view taken along a plane passing through a first driven element 141 and a second driven element 142.

As illustrated in FIG. 5B, one end of a feed line 161 is connected to a feed point 191 of the first driven element 141. The other end of the feed line 161 is connected to an RFIC 110. One end of a feed line 162 is connected to a feed point 192 of the second driven element 142. The other end of the feed line 162 is connected to the RFIC 110. The feed lines 161 and 162 extend through the ground conductor 190. Radio-frequency signals are transmitted from the RFIC 110 to the first driven element 141 and the second driven element 142 through the feed lines 161 and 162.

In the second embodiment, which is illustrated in FIGS. 5A and 5B, a first groove 151 is located between the first driven element 141 and the second driven element 142.

A second groove 152 is also provided in the antenna module 100A. When the antenna module 100A is viewed in plan in the direction of the Z axis, the second groove 152 is opposite to the first groove 151 with the first driven element 141 therebetween.

A third groove 153 is also provided in the antenna module 100A. When the antenna module 100A is viewed in plan in the direction of the Z axis, the third groove 153 is opposite to the first groove 151 with the second driven element 142 therebetween.

The distance between the first driven element 141 and the first groove 151 is preferably equal to the distance between the first driven element 141 and the second groove 152. The distance between the second driven element 142 and the second groove 152 is preferably equal to the distance between the second driven element 142 and the third groove 153. The depth of the first groove 151, the depth of the second groove 152, and the depth of the third groove 153 are all denoted by H and are preferably the same. The first groove 151, the second groove 152, and the third groove 153 preferably have the same shape when viewed in plan. When the first groove 151, the second groove 152, and the third groove 153 satisfy these conditions, the symmetry of the antenna module is ensured.

FIGS. 6A and 6B illustrate the results of simulations conducted on the antenna module according to the present embodiment. FIGS. 6A and 6B illustrate the changes in the return loss of an antenna element including the first driven element 141 in the present embodiment. The changes in the return loss of an antenna element including the second driven element 142 are identical to the results illustrated in FIGS. 6A and 6B.

As is clear from the results in FIGS. 6A and 6B, providing the grooves in the second embodiment is as effective as providing the grooves in the previous embodiment; that is, as the depth H of the grooves 150 becomes greater, the resonant frequency f0 increases correspondingly. Given the grooves described above, the second embodiment offers an improvement in return loss over that achievable in the previous embodiment illustrated in FIGS. 4A and 4B.

Third Embodiment

In a third embodiment, a first groove 151 is located between a first driven element 141 and a second driven element 142. The second groove 152 and the third groove 153 in the second embodiment described above are not provided in the third embodiment. Referring to FIG. 7, an antenna module 100B according to the third embodiment is viewed in plan in the direction of the Z axis.

Although the amount of shift in the resonant frequency f0 in the third embodiment is slightly less than the amount of shift in the resonant frequency f0 in the second embodiment, the elimination of the second groove 152 and the third groove 153 leads to cost reduction.

From the results of simulations (not illustrated), it is found that the amount of shift in the resonant frequency f0 in the third embodiment is less than the amount of shift in the resonant frequency f0 in the second embodiment. This is due to the absence of the second groove 152 and the third groove 153. The amount of decrease in the effective dielectric constant in sites where electric lines of force extend between the first driven element 141 and the ground conductor 190 and between the second driven element 142 and the ground conductor 190 is less than the amount of decrease in the effective dielectric constant in the corresponding sites in the second embodiment in which the second groove 152 and the third groove 153 are provided.

In designing an antenna module, consideration will be given to the amount of resonant frequency adjustment achievable for the type of housing that is to be fitted over the antenna module and to the cost of providing the grooves, and either the configuration of the second embodiment or the configuration of the third embodiment, whichever is better suited, will be adopted.

Fourth Embodiment

An antenna module according to the fourth embodiment includes an array of driven elements. More specifically, the antenna module according to the present embodiment includes a two-by-two array of driven elements. In the present embodiment, two driven elements are each located between grooves, and the other two driven elements are also each located between grooves.

Referring to FIG. 8, driven elements of an antenna module 100C according to the fourth embodiment and a region around the driven elements are viewed in plan in the direction of the Z axis. In addition to the grooves adjacent to first and second driven elements disposed side by side, grooves adjacent to third and fourth driven elements disposed side by side are provided in the antenna module 100C according to the fourth embodiment.

In the fourth embodiment, which is illustrated in FIG. 8, a first driven element 141, a second driven element 142, a third driven element 143, and a fourth driven element 144 are arranged in a two-by-two array.

The following describes the arrangement of the driven elements in more detail with reference to FIG. 8. The third driven element 143 and the first driven element 141 are adjacent to each other in the direction (of the Y axis) orthogonal to the direction (of the X axis) from the first driven element 141 to the second driven element 142. The fourth driven element 144 and the second driven element 142 are adjacent to each other in the direction (of the Y axis) orthogonal to the direction (of the X axis) from the second driven element 142 to the first driven element 141.

Four feed lines (not illustrated) extend from the RFIC 110. The four feed lines are connected to a feed point 191 of the first driven element 141, a feed point 192 of the second driven element 142, a feed point 193 of the third driven element 143, a feed point 194 of the fourth driven element 144, respectively.

In the fourth embodiment, which is illustrated in FIG. 8, a fourth groove 154 is located between the third driven element 143 and the fourth driven element 144.

A fifth groove 155 is also provided in the antenna module 100C. When the antenna module 100C is viewed in plan in the direction of the Z axis, the fifth groove 155 is opposite to the fourth groove 154 with the third driven element 143 therebetween.

A sixth groove 156 is also provided in the antenna module 100C. When the antenna module 100C is viewed in plan in the direction of the Z axis, the sixth groove 156 is opposite to the fourth groove 154 with the fourth driven element 144 therebetween.

The distance between the third driven element 143 and the fourth groove 154 is preferably equal to the distance between the third driven element 143 and the fifth groove 155. The distance between the fourth driven element 144 and the fourth groove 154 is preferably equal to the distance between the fourth driven element 144 and the sixth groove 156. The depth of the first groove 151, the depth of the second groove 152, the depth of the third groove 153, the depth of the fourth groove 154, the depth of the fifth groove 155, and the depth of the sixth groove 156 are all denoted by H and are preferably the same. The first groove 151, the second groove 152, the third groove 153, the fourth groove 154, the fifth groove 155, and the sixth groove 156 preferably have the same shape when viewed in plan. When the first groove 151, the second groove 152, the third groove 153, the fourth groove 154, the fifth groove 155, and the sixth groove 156 satisfy these conditions, the symmetry of the antenna module is ensured.

FIGS. 9A and 9B illustrate the results of simulations conducted on the antenna module according to the present embodiment. FIGS. 9A and 9B illustrate the changes in the return loss of an antenna element including the first driven element 141. The changes in the return loss of an antenna element including the second driven element 142, the changes in the return loss of an antenna element including the third driven element 143, the changes in the return loss of an antenna element including the third driven element 143, and the changes in the return loss of an antenna element including the fourth driven element 144 are identical to the results illustrated in FIGS. 9A and 9B.

As is clear from the results in FIGS. 9A and 9B, providing the grooves in the fourth embodiment is as effective as providing the grooves in the embodiments above; that is, as the depth H of the grooves becomes greater, the resonant frequency f0 increases correspondingly.

The fourth embodiment may be modified in such a manner that the fifth groove 155 and the sixth groove 156 are eliminated. In this modification (not illustrated), the fourth groove 154 is provided. The amount of shift in the resonant frequency f0 in this modification of the fourth embodiment is less than the amount of shift in the resonant frequency f0 in the fourth embodiment. This is due to the absence of the fifth groove 155 and the sixth groove 156. The amount of decrease in the effective dielectric constant in sites where electric lines of force extend between the third driven element 143 and the ground conductor 190 and between the fourth driven element 144 and the ground conductor 190 is less than the amount of decrease in the effective dielectric constant in the corresponding sites in the fourth embodiment in which the fifth groove 155 and the sixth groove 156 are provided.

In designing an antenna module, consideration will be given to the amount of resonant frequency adjustment achievable for the type of housing that is to be fitted over the antenna module and to the cost of providing the grooves, and either the configuration of the fourth embodiment or the configuration of this modification of the fourth embodiment, whichever is better suited, will be adopted.

Fifth Embodiment

In a fifth embodiment, a driven element 140 is rectangular, and four grooves extend along the respective sides of the driven element 140. Referring to FIG. 10, an antenna module 100D according to the fifth embodiment is viewed in plan in the direction of the Z axis.

Four grooves 150 extend along the respective sides of the driven element 140 illustrated in FIG. 10. More specifically, a groove 150*a*, a groove 150*b*, a groove 150*c*, and a groove 150*d* are provided. The groove 150*a* and the groove 150*b* face a side 140*a* and a side 140*b*, respectively. The sides 140*a* and 140*b* extend in the direction (of the Y axis) orthogonal to the direction (of the X axis) in which radio-frequency signals radiated from the driven element 140 are polarized. The groove 150*c* and the groove 150*d* face a side 140*c* and a side 140*d*, respectively. The sides 140*c* and 140*d* extend in the direction (of the X axis) in which radio-frequency signals radiated from the driven element 140 are polarized. The grooves 150*a*, 150*b*, 150*c*, and 150*d* are hereinafter also referred to as "four grooves 150".

The distance between the driven element 140 and each of the four grooves 150 is denoted by L and is preferably the same for all of the grooves 150. The depth of each of the four grooves 150 is denoted by H and is preferably the same for all of the grooves 150. The four grooves 150 preferably have the same shape when viewed in plan. That is, the grooves 150 extending along the respective sides in the polarization direction are preferably shaped in a manner so as to be mirror images of each other with respect to the driven element. With the four grooves 150 being provided as described above, the symmetry of the antenna module is ensured.

FIGS. 11A and 11B illustrate the results of simulations conducted on the antenna module according to the present embodiment. FIGS. 11A and 11B illustrate the changes in the return loss of the antenna element according to the present embodiment.

The results of the simulations in the first embodiment (see FIGS. 4A and 4B) are as follows: the resonant frequency f0 for the case in which the depth of the grooves 150 is 0.2 mm is 29.4 GHz; the resonant frequency f0 for the case in which the depth of the grooves 150 is 0.4 mm is 30.2 GHz; and the resonant frequency f0 for the case in which the depth of the grooves 150 is 0.6 mm is 30.7 GHz. The results of the simulations in the present embodiment (see FIGS. 11A and 11B) are as follows: the resonant frequency f0 for the case in which the depth of the grooves 150 is 0.2 mm is 30.1 GHz; the resonant frequency f0 for the case in which the depth of the grooves 150 is 0.4 mm is 31.2 GHz; and the resonant frequency f0 for the case in which the depth of the grooves 150 is 0.6 mm is 31.9 GHz.

Form the results of simulations in the first embodiment and the results of simulations in the present embodiment, it is found that the antenna module according to the present embodiment achieves an increase in the amount of shift in the resonant frequency f0.

The following describes the reason why the amount of shift in the resonant frequency f0 is greater in the antenna module 100D according to the present embodiment than in the antenna module according to the first embodiment. The grooves 150*c* and 150*d* are provided in the antenna module 100D according to the present embodiment, whereas the grooves 150*c* and 150*d* are not provided in the antenna module 100 according to the first embodiment.

Electric lines of force extend from the four sides including the sides 140*c* and 140*d*. The effective dielectric constant of the portion between the driven element 140 and the ground conductor is lower in the antenna module 100D according to the present embodiment than in the antenna module 100 according to the first embodiment. The decrease in the effective dielectric constant is due to the presence of the grooves 150*c* and 150*d* provided in the antenna module 100D. For this reason, the amount of shift in the resonant frequency f0 is greater in the antenna module 100D according to the present embodiment than in the antenna module 100 according to the first embodiment.

With radio-frequency signals radiated from the driven element 140 illustrated in FIG. 10 being polarized in the direction of the X axis, the density of electric lines of force extending between the driven element 140 and the ground conductor is higher in the direction of the X axis than in the direction of the Y axis. The grooves 150*a* and 150*b* face the respective sides of the driven element 140 that extend in the direction of the X axis; that is, the grooves 150*a* and 150*b* face the sides 140*a* and 140*b*, respectively. The grooves 150*c* and 150*d* face the respective sides of the driven element 140 that extend in the direction of the Y axis; that is, the grooves 150*c* and 150*d* face the sides 140*c* and 140*d*, respectively. The density of electric lines of force in sites where the grooves 150*c* and 150*d* are provided is lower than the density of electric lines of force in sites where the grooves 150*a* and 150*b* are provided. The grooves 150*c* and 150*d* make a less significant contribution to the increase in the resonant frequency f0 than the grooves 150*a* and 150*b*.

Sixth Embodiment

In the fifth embodiment, radio-frequency signals radiated from the driven element 140 are polarized in one direction as described above. In a sixth embodiment, the fifth embodiment is modified in such a manner that a radio-frequency signal radiated from the driven element 140 is polarized in either a first polarization direction or a second polarization direction.

FIG. 12 illustrates an antenna module 100E according to the sixth embodiment. The driven element 140 in this modification has two feed points, which are denoted by 191 and 192, respectively. The driven element 140 radiates radio-frequency signals polarized in the direction of the X axis and radio-frequency signals polarized in the direction of the Y axis. The polarization direction that coincides with the direction of the Y axis corresponds to a second polarization direction in the present disclosure. The first polarization direction (i.e., the direction of the X axis) is orthogonal to the second polarization direction (i.e., the direction of the Y axis).

The grooves 150*a* and 150*b* contribute mainly to the increase in the resonant frequency of the radio-frequency signals polarized the first polarization direction (i.e., the direction of the X axis). The grooves 150*c* and 150*d* contribute mainly to the increase in the resonant frequency of the radio-frequency signals polarized in the second polarization direction (i.e., the direction of the Y axis).

The antenna module 100E according to the present embodiment produces effects equivalent to the effects produced by the antenna module according to the fifth embodiment. The added advantage of the present embodiment is that the antenna module 100E radiates a radio-frequency signal polarized in the first polarization direction (i.e., the direction of the X axis) and a radio-frequency signal polarized in the second polarization direction (i.e., the direction the Y axis).

Seventh Embodiment

The antenna module according to any one of the embodiments above includes a driven element fed with radio-frequency signals (radio-frequency power) from the RFIC 110. An antenna module according to a seventh embodiment includes, in addition to the driven element, a parasitic element that is not fed with radio-frequency signals (radio-frequency power) from the RFIC.

FIG. 13A illustrates an antenna module 100F viewed in plan in the direction of the Z axis. FIG. 13B is a sectional view of the antenna module 100F according to the seventh embodiment, illustrating the antenna module 100F taken along a plane passing through a feed point 251. Referring to FIG. 13A, a parasitic element 231 and some of the components of the antenna module are seen through a dielectric substrate 130. The antenna module according to the present embodiment, which is illustrated in FIGS. 13A and 13B, includes a driven element 221 and the parasitic element 231. Two resonant frequencies (the resonant frequency of the driven element 221 and the resonant frequency of the parasitic element 231) are exhibited accordingly.

As illustrated in FIG. 13A, the driven element 221 and the parasitic element 231 overlap each other, or more specifically, the driven element 221 is located within the parasitic element 231 when the antenna module 100F according to the present embodiment is viewed in plan. In a modification of the present embodiment, the driven element 221 and the parasitic element 231 may overlap each other in such a manner that at least part of the driven element 221 is located within the parasitic element 231 when the antenna module 100F is viewed in plan.

The parasitic element 231 is disposed between the driven element 221 and a mounting surface 132. A feed line 161 extends through the parasitic element 231 and is connected to the driven element 221. The driven element 221 and the parasitic element 231 in the present embodiment are both rectangular when viewed in plan. The area of the parasitic element 231 is greater than the area of the driven element 221 when the antenna module 100F is viewed in plan.

Referring to FIGS. 13A and 13B, a junction 110A of an RFIC 110 and an ground conductor 190 is denoted, and stubs 402 and 403 branching from the feed line 161 are denoted.

The stubs 402 and 403 are disposed on a layer between a layer on which the ground conductor 190 is disposed and layers on which the driven element 221 and the parasitic element 231 (radiation electrode) are disposed.

The stubs 402 and 403 are disposed, for example, to provide impedance matching of the antenna module 100F and to broaden the bandwidth of radio-frequency signals transmitted or received through the antenna module 100F.

A groove 302 is provided in the antenna module 100F according to the present embodiment. The groove 302 is separate from the parasitic element 231 when the antenna module 100F is viewed in plan. The groove 302 extends toward the ground conductor 190. Referring to FIGS. 13A and 13B, the groove 302 extends along the periphery of the parasitic element 231, which is rectangular. The distance between the groove 302 and the parasitic element 231 is preferably equal to or more than 10 μm and equal to or less than λ/2. In FIGS. 13A, 15A, 17A, and 19A, the regions corresponding to the respective grooves are dotted with small spots.

FIG. 14 illustrates the results of simulations conducted on the antenna module 100F according to the present embodiment. A broken line S1 in FIG. 14 represents a comparative example in which the groove 302 is not provided. A solid line S2 in FIG. 14 represents the present embodiment in which the groove 302 is provided.

As indicated by the broken line S1 in FIG. 14, the resonant frequency of a parasitic element in the comparative example is denoted by f1 and is about 29 GHz, and the resonant frequency of a driven element in the comparative example is denoted by f2 and is about 40.5 GHz. As indicated by the solid line S2 in FIG. 14, the resonant frequency of the parasitic element 231 in the present embodiment is denoted by f1*a* and is about 31 GHz, and the resonant frequency of the driven element 221 in the present embodiment is denoted by f2*a* and is about 41 GHz.

It can be seen from FIG. 14 that the resonant frequency of the parasitic element 231 increased by about 2 GHz. This is due to the presence of the groove 302. It can also be seen from FIG. 14 that the resonant frequency of the driven element 221 increased by about 0.5 GHz. This is also due to the presence of the groove 302.

The antenna module 100F according to the present embodiment includes the driven element 221 and the parasitic element 231. The groove 302 is adjacent to the parasitic element 231 and is separate from the parasitic element 231. The resonant frequency of the parasitic element 231, in particular, is thus changeable.

In the present embodiment, the distance between the groove 302 and the parasitic element 231 is shorter than the distance between the groove 302 and the driven element 221. The groove 302 is located between the parasitic element 231 and the ground conductor 190; that is, the groove 302 is located in a site where the density of electric lines of force is higher than the density of electric lines of force in a site between the driven element 221 and the ground conductor 190. This layout offers an advantage in that the amount of shift in the resonant frequency of the parasitic element 231 is greater than the amount of shift in the resonant frequency of the driven element 221.

The parasitic element 231 in the present embodiment is disposed between the driven element 221 and the mounting surface 132. The area of the parasitic element 231 viewed in plan is greater than the area of the driven element 221 viewed in plan. The difference in area translates in the difference between the resonant frequency of the parasitic element 231 and the resonant frequency of the driven element 221. This enables the antenna module on the whole to operate in two different frequency bands.

Eighth Embodiment

As described above, the antenna module according to the seventh embodiment includes the driven element 221 and the parasitic element 231 and is grooved. The groove in the seventh embodiment is adjacent to the parasitic element 231 and is separate from the parasitic element 231. An antenna module according to an eighth embodiment includes a driven element 221 and a parasitic element 231 and is grooved. The groove in the eighth embodiment is adjacent to the driven element 221 and is separate from the driven element 221. The groove overlaps the parasitic element 231 when the antenna module is viewed in plan in the direction of the Z axis.

Referring to FIG. 15A, an antenna module 100G according to the present embodiment is viewed in plan in the direction of the Z axis. FIG. 15B is a sectional view of the antenna module 100G according to the eighth embodiment, illustrating the antenna module 100G taken along a plane passing through a feed point 251. As illustrated in FIGS. 15A and 15B, a groove 312 is adjacent to the driven element 221 and is separate from the driven element 221. The distance between the groove 312 and the driven element 221 is preferably equal to or more than 10 μm and equal to or less than λ/2. The groove 312 overlaps the parasitic element 231 when the antenna module 100G is viewed in plan in the direction of the Z axis.

FIG. 16 illustrates the results of simulations conducted on the antenna module 100G according to the present embodiment. As indicated by a broken line S1 in FIG. 16, the resonant frequency of a parasitic element in a comparative example is denoted by f1 and is about 29 GHz, and the resonant frequency of a driven element in a comparative example is denoted by f2 and is about 40.5 GHz. As indicated by a solid line S2 in FIG. 16, the resonant frequency of the parasitic element 231 in the present embodiment is denoted by f1*a* and is about 29.5 GHz, and the resonant frequency of the driven element 221 in the present embodiment is denoted by f2*a* and is about 42.5 GHz.

It can be seen from FIG. 16 that the resonant frequency of the parasitic element 231 increased by about 0.5 GHz. This is due to the presence of the groove 312. It can also be seen from FIG. 16 that the resonant frequency of the driven element 221 increased by about 2 GHz. This is also due to the presence of the groove 312.

The antenna module 100G according to the present embodiment includes the driven element 221 and the parasitic element 231. The groove 312 is adjacent to the driven element 221 and is separate from the driven element 221. The resonant frequency of the driven element 221, in particular, is thus changeable.

In the present embodiment, which is illustrated in FIG. 15B, the groove 312 is located between the driven element 221 and the ground conductor 190 and between the driven element 221 and the parasitic element 231. The density of electric lines of force in the site between the driven element 221 and the ground conductor 190 and the density of electric lines of force in the site between the driven element 221 and the parasitic element 231 are both high. The present embodiment thus enables a shift in the resonant frequency of the driven element 221.

No groove is provided between the parasitic element 231 and the ground conductor 190. Nevertheless, there is a slight shift in the resonant frequency of the parasitic element 231. This is due to the changes in the frequency characteristics of the driven element 221 (changes in the pattern of electric lines of force in the site between the driven element 221 and the parasitic element 231).

Ninth Embodiment

As described above, the antenna module according to the seventh embodiment includes the driven element 221 and the parasitic element 231 and is grooved. The groove 302 in the seventh embodiment is adjacent to the parasitic element 231 and is separate from the parasitic element 231. The antenna module according to the eighth embodiment includes the driven element 221 and the parasitic element 231 and is grooved. The groove 312 in the eighth embodiment is adjacent to the driven element 221 and is separate from the driven element 221. In a ninth embodiment, the groove 302 and the groove 312 are merged into one.

Referring to FIG. 17A, an antenna module 100H according to the present embodiment is viewed in plan in the direction of the Z axis. FIG. 17B is a sectional view taken along a plane passing through a feed point 251.

A groove is adjacent to a parasitic element 231 and is separate from the parasitic element 231. Another groove is adjacent to the driven element 221 and is separate from the driven element 221. These grooves are merged into one and is denoted by 322.

The groove 322 is provided in such a manner that a ridge 321, a ridge 326, and a ridge 328 are formed. The ridge 321 is adjacent to the driven element 221. The ridge 326 is adjacent to the parasitic element 231. The side on which the ridge 328 is located is opposite to the side on which the driven element 221 and the parasitic element 231 are located. In the present embodiment, the distance between the groove 322 and the parasitic element 231 is, by design, equal to the distance between the groove 322 and the driven element 221. To be more precise, the distance between the ridge 321 and the driven element 221 is, by design, equal to the distance between the ridge 326 and the parasitic element 231. A step is defined by the ridge 321 and the ridge 326.

The groove 322 is provided in such a manner that a side surface 332, a side surface 334, and a side surface 336 are formed. The side surface 332 is adjacent to the driven element 221. The side surface 334 is adjacent to the parasitic element 231. The side on which the side surface 336 is located is opposite to the side on which the driven element 221 and the parasitic element 231 are located. The side surface 332 and the side surface 334 define a step (the ridge 326), whereas there is no step on the side surface 336.

FIG. 18 illustrates the results of simulations conducted on the antenna module 100H according to the present embodiment. A broken line S1 in FIG. 18 represents a comparative example in which the groove 322 is not provided. A solid line S2 in FIG. 18 represents the present embodiment in which the groove 322 is provided.

As indicated by the broken line S1 in FIG. 18, the resonant frequency of a parasitic element in the comparative example is denoted by f1 and is about 29 GHz, and the resonant frequency of a driven element in the comparative example is denoted by f2 and is about 40.5 GHz. As indicated by the solid line S2 in FIG. 18, the resonant frequency of the parasitic element 231 in the present embodiment is denoted by f1*a* and is about 32 GHz, and the resonant frequency of the driven element 221 in the present embodiment is denoted by f2*a* and is about 43 GHz.

It can be seen from FIG. 18 that the resonant frequency of the parasitic element 231 increased by about 3 GHz. This is due to the presence of the groove 322. It can also be seen from FIG. 18 that the resonant frequency of the driven element 221 increased by about 2.5 GHz. This is also due to the presence of the groove 322.

The antenna module 100H according to the present embodiment includes the driven element 221 and the parasitic element 231. The groove 322 is adjacent to the driven element 221 and is separate from the driven element 221. The groove 322 is also adjacent to the parasitic element 231 and is separate from the parasitic element 231. The resonant frequency of the driven element 221 and the resonant frequency of the parasitic element 231 may thus be appropriately changed.

The groove in the present embodiment is greater than the groove in the seventh embodiment and is greater than the groove in the eighth embodiment. The decrease in the effective dielectric constant of the dielectric substrate 130 having the groove in the present embodiment is therefore greater than the decrease in the effective dielectric constant of the dielectric substrate 130 having the groove in either of the seventh or eighth embodiment. For this reason, the amount of shift in the resonant frequency is greater in the present embodiment than in each of the seventh and eighth embodiments.

The present embodiment differs from the seventh and eighth embodiments in that the distance between the groove 322 and the parasitic element 231 is equal to the distance between the groove 322 and the driven element 221. The distance between the groove 322 and the parasitic element 231 and the distance between the groove 322 and the driven element 221 are each preferably equal to or more than 10 μm and equal to or less than λ/2.

In the presence of the groove 322, the resultant change in the density of electric lines of force extending between the driven element 221 and the ground conductor 190 is equivalent or substantially equivalent to the resultant change in the density of electric lines of force extending between the parasitic element 231 and the ground conductor 190. The present embodiment offers an advantage in that the amount of shift in the resonant frequency of the driven element 221 and the amount of shift in the resonant frequency of the parasitic element 231 are both increased.

There is no step on the side surface 336, which is one of the sides defining the groove 322 and is discretely located away from the driven element 221 and the parasitic element 231. The elimination of the step provided on the side surface discretely located away from the driven element 221 and the parasitic element 231 of the antenna module leads to a reduction in the cost of forming the groove 322.

The present embodiment may be modified in such a manner that the distance between the groove 322 and the parasitic element 231 is not equal to the distance between the groove 322 and the driven element 221.

Tenth Embodiment

In a tenth embodiment, additional grooves are provided. The additional grooves are adjacent to stubs. FIG. 19A illustrates an antenna module 100I viewed in plan in the direction of the Z axis. FIG. 19B is a sectional view taken along a plane passing through a feed point 251.

As illustrated in FIGS. 19A and 19B, the antenna module 100I according to the present embodiment includes a driven element 221 and a parasitic element 231. The driven element 221 radiates radio-frequency signals polarized in the first polarized direction (i.e., the direction of the X axis) and radio-frequency signals polarized in the second polarization direction.

The driven element 221 has the feed point 251 and a feed point 252. The feed point 251 of the driven element 221 is connected with one end of a feed line 161. The other end of the feed line 161 is connected to an RFIC 110. The feed point 252 of the driven element 221 is connected with one end of a feed line 162. The other end of the feed line 162 is connected to the RFIC 110.

The stubs 404 and 405 are connected to the feed line 162. The stubs 404 and 405 are disposed on a layer between a layer on which the ground conductor 190 is disposed and layers on which the driven element 221 and the parasitic element 231 are disposed. The stubs 404 and 405 extend in the direction of the Y axis.

In the present embodiment, a groove 325 is adjacent to a stub 402 and a stub 403, and a groove 324 is adjacent to the stub 404 and the stub 405. In the present embodiment, which is illustrated in FIG. 19A, the groove 325 is located immediately above the stubs 402 and 403, and the groove 324 is located immediately above the stubs 404 and 405. More specifically, the grooves 324 and 325 extend from a placement surface 131 (i.e., a surface on which the driven element 221 is disposed) toward the ground conductor 190. Referring to FIGS. 19A and 19B, the grooves 324 and 325 extend from the placement surface 131 to the ground conductor 190. The present embodiment may be modified in such a manner that the grooves 324 and 325 extend from the placement surface 131 to a level between the placement surface 131 and the ground conductor 190. The groove 324 extends over the stubs 404 and 405 when the antenna module 100I is viewed in plan in the direction of the Z axis. The groove 325 extends over the stubs 402 and 403 when the antenna module 100I is viewed in plan in the direction of the Z axis. The groove 325, which is located immediately above the stubs 402 and 403, is away in the direction of the Y axis from the section illustrated in FIG. 19B and is therefore not illustrated in FIG. 19B. Referring to FIG. 19B, the groove 322 described in the ninth embodiment is provided.

It can also be seen from FIGS. 19A and 19B that the antenna module and a housing 400, which is illustrated in a simplified form and is fitted over the antenna module, constitute a communication device 10I.

Although the grooves 324 and 325 may each be located in any place close to the stubs, the grooves 324 and 325 are preferably located immediately above the stubs. The reason is that the density of electric lines of force extending between the ground conductor 190 and the stubs is higher in regions immediately above the stubs than in any other region close to the stubs.

Grooves may be provided in such a manner that the grooves are adjacent to one or more, but not all, of the stubs of the antenna module 100I. Alternatively, the grooves may be located immediately above all of the stubs. Still alternatively, the grooves may be located immediately above one or more, but not all, of the stubs. Each groove may be located immediately above at least part of the corresponding one of the stubs 402, 403, 404, and 405. The grooves 324 and 325 may each be discretely located away from the stubs. The grooves 324 and 325 may be provided in a manner so as to be in contact with the respective stubs.

FIG. 20 illustrates the results of simulations conducted on the antenna module 100I according to the present embodiment. A broken line S1 represents an example of the antenna module 100I. In this example, the antenna module 100I is not covered with the housing 400 and is not grooved, or more specifically, the grooves 322, 324, and 325 are not provided. A solid line S2 represents another example of the antenna module 100I. In this example, the antenna module 100I is covered with the housing 400 and is not grooved, or more specifically, the grooves 322, 324, and 325 are not provided. A dash-dot line S3 represents still another example of the antenna module 100I. In this example, the antenna module 100I is covered with the housing 400, and the groove 322 is adjacent to the driven element 221 and the parasitic element 231. Grooves adjacent to the stubs, or more specifically, the groove 325 adjacent to the stubs 402 and 403 and the groove 324 adjacent to the stubs 404 and 405 are not provided. A dash-dot-dot line S4 represents yet still another example of the antenna module 100I. In this example, the antenna module 100I is covered with the housing 400, and a groove adjacent to the radiation electrode (i.e., the groove 322 adjacent to the driven element 221 and the parasitic element 231) and grooves adjacent to the stubs are provided.

As indicated by the broken line S1 in FIG. 20, the resonant frequency of the parasitic element 231 of the antenna module that is not covered with the housing 400 and not grooved (i.e., the grooves 322, 324, and 325 are not provided) is denoted by f1 and is about 29 GHz, and the resonant frequency of the driven element 221 of the antenna module concerned is denoted by f2 and is about 40.5 GHz.

As indicated by the solid line S2 in FIG. 20, the resonant frequency of the parasitic element 231 of the antenna module that is covered with the housing 400 and not grooved (i.e., the grooves 322, 324, and 325 are not provided) is denoted by f1*a* and is about 28 GHz, and the resonant frequency of the driven element 221 of the antenna module concerned is denoted by f2*a* and is about 39.5 GHz.

As indicated by the dash-dot line S3 in FIG. 20, the resonant frequency of the parasitic element 231 of the antenna module that is covered with the housing 400 and grooved (or more specifically, the groove 322 is adjacent to the driven element 221 and the parasitic element 231, and grooves adjacent to the stubs are not provided) is denoted by f1*b* and is about 31 GHz, and the resonant frequency of the driven element 221 of the antenna module concerned is denoted by f2*b* and is about 43 GHz.

As indicated by the dash-dot-dot line S4 in FIG. 20, the resonant frequency of the parasitic element 231 of the antenna module that is covered with the housing 400 and grooved (or more specifically, the groove 322 is provided, and grooves adjacent to the stubs are also provided) is denoted by f1*c* and is about 31 GHz, and the resonant frequency of the driven element 221 of the antenna module concerned is denoted by f2*c* and is about 42.5 GHz.

It can be seen from FIG. 20 that, with the addition of the housing 400 to the antenna module, the resonant frequency of the parasitic element 231 of the antenna module decreased by about 1 GHz, and the resonant frequency of the driven element 221 of the antenna module concerned also decreased by about 1 GHz.

It can also be seen from FIG. 20 that, in the presence of the groove 322, the resonant frequency of the parasitic element 231 of the antenna module covered with the housing 400 increased by about 3 GHz, and the resonant frequency of the driven element 221 of the antenna module concerned increased by about 3.5 GHz.

It can also be seen from FIG. 20 that, in the presence of the grooves 322, 324, and 325, the resonant frequency of the parasitic element 231 of the antenna module covered with the housing 400 increased by about 3 GHz, and the resonant frequency of the driven element 221 of the antenna module concerned increased by about 3 GHz.

As indicated by the resonant frequency f2*b* and the resonant frequency f2*c* in FIG. 20, the example in which the grooves 324 and 325 are provided offers an improvement in return loss over that achievable in the example in which the grooves 324 and 325 are not provided.

When the antenna module 100I according to the present embodiment is viewed in plan, the grooves 324 and 325 extend over the respective stubs (the stubs 402 and 404). This layout enables not only the increases in resonant frequency but also the adjustments to the impedance of the stubs (the stubs 402 and 404), thus enabling the antenna module 100I to achieve improved antenna characteristics, or more specifically, improved return loss.

Eleventh Embodiment

In an eleventh embodiment, grooves are provided in a housing with which a dielectric substrate is covered. Each of FIGS. 21A, 21B and 21C is provided for explanation of the eleventh embodiment.

FIG. 21A is a sectional view of an antenna module 100J according to the eleventh embodiment, illustrating the antenna module 100J taken along a plane passing through a feed point 251. Referring to FIG. 21A, an RFIC 110 is disposed on a mounting surface 132 of a dielectric substrate 130. A driven element 221, a feed line 161, and a ground conductor 190 are disposed in the dielectric substrate 130. The ground conductor 190 and the driven element 221 in the dielectric substrate 130 face each other. One end of the feed line 161 is connected to the feed point 251 of the driven element 221. The other end of the feed line 161 is connected to the RFIC 110. The dielectric substrate 130 has two opposite surfaces, one of which is the mounting surface 132. The other surface is herein referred to as an opposite surface 133.

The housing in the present embodiment is denoted by 500 and is at least partially made of a dielectric material. Referring to FIG. 21A, a parasitic element 231 is disposed in the dielectric material portion of the housing 500. That is, the parasitic element 231 is disposed in the housing 500.

The housing 500 has a first surface 504 and a second surface 506. The second surface 506 faces the dielectric substrate 130. More specifically, the second surface 506 faces the opposite surface 133. Referring to FIG. 21A, the second surface 506 and the opposite surface 133 are discretely located away from each other, with an air gap 508 therebetween.

The housing 500 in FIG. 21A has grooves 502, which are each separate from the parasitic element 231. The grooves 502 extend from the second surface 506 to a level between the parasitic element 231 and the first surface 504.

The grooves 502 provided as described above with reference to FIG. 21A offer an advantage in that the (effective) dielectric constant of the portion between the parasitic element 231 and the ground conductor 190 is adjustable, and the resonant frequency of the parasitic element 231 is thus changeable.

FIG. 21B is a sectional view of an antenna module 100K according to a modification of the eleventh embodiment, illustrating the antenna module 100K taken along a plane passing through the feed point 251. In the example described above with reference to FIG. 21A, the parasitic element 231 is disposed in the housing 500, and the driven element 221 is disposed in the dielectric substrate 130. In another example, which will be described below with reference to FIG. 21B, the driven element 221 is disposed in the housing 500, and the parasitic element 231 is disposed in the dielectric substrate 130.

Referring to FIG. 21B, the housing 500 has a via 522, which is located in the housing 500. A feed line 520 extends between the housing 500 and the dielectric substrate 130 (i.e., through the air gap 508). Radio-frequency power is transmitted from the RFIC 110 to the driven element 221 through the feed lines 161 and 520 and the via 522. The feed line 520 in FIG. 21B is schematically illustrated. The feed line 520 may be a spring terminal, a conductive elastomer, or any other member that exerts elastic force and is configured to form an electrical connection between the RFIC 110 and the driven element 221 when being fitted with the housing 500.

Referring to FIG. 21B, the grooves 502 provided in the housing 500 are each separate from the driven element 221. The grooves 502 extend from the second surface 506 to a level between the driven element 221 and the first surface 504.

The grooves 502 provided as described above with reference to FIG. 21B offer an advantage in that the (effective) dielectric constant of the portion between the driven element 221 and the ground conductor 190 is adjustable, and the resonant frequency of the driven element 221 is thus changeable.

FIG. 21C is a sectional view of an antenna module 100L according to another modification of the eleventh embodiment, illustrating the antenna module 100L taken along a plane passing through the feed point 251. The parasitic element 231 illustrated in FIG. 21B is not included in the antenna module 100L illustrated in FIG. 21C.

The grooves 502 provided as described above with reference to FIG. 21C offer an advantage in that the (effective) dielectric constant of the portion between the driven element 221 and the ground conductor 190 is adjustable, and the resonant frequency of the driven element 221 is thus changeable.

Each of FIGS. 22A and 22B is provided for explanation of antenna modules according to other modifications of the eleventh embodiment. In the example described above with reference to FIGS. 21A, 21B and 21C, the groove is provided in the second surface 506. In the following examples, which will be described below with reference to FIGS. 22A and 22B, the groove is provided in the first surface 504.

FIG. 22A is a sectional view of an antenna module 100M, illustrating the antenna module 100M taken along a plane passing through the feed point 251. The differences between the antenna module illustrated in FIG. 21A and the antenna module illustrated in FIG. 22A are as follows. The grooves 502 in FIG. 21A are provided in the second surface 506, whereas the grooves 502 in FIG. 22A are provided in the first surface 504.

Referring to FIG. 22A, the grooves 502 provided in the housing 500 are each separate from the parasitic element 231. The grooves 502 extend from the first surface 504 to a level between the second surface 506 and a surface 512 (layer) on which the parasitic element 231 is disposed.

The grooves 502 provided as described above with reference to FIG. 22A offer an advantage in that the (effective) dielectric constant of the portion between the parasitic element 231 and the ground conductor 190 is adjustable, and the resonant frequency of the parasitic element 231 is thus changeable.

FIG. 22B is a sectional view of an antenna module 100N, illustrating the antenna module 100N taken along a plane passing through the feed point 251. The differences between the antenna module illustrated in FIG. 22A and the antenna module illustrated in FIG. 22B are as follows. The parasitic element 231 in FIG. 22A is disposed in the housing 500, whereas the parasitic element 231 in FIG. 22B is disposed on a surface (e.g., the first surface 504) of the housing 500.

Referring to FIG. 22B, the grooves 502 provided in the housing 500 are each separate from the driven element 221. The grooves 502 extend from the first surface 504 to a level between the parasitic element 231 and the second surface 506.

The grooves 502 provided as described above with reference to FIG. 22B offer an advantage in that the (effective) dielectric constant of the portion between the parasitic element 231 and the ground conductor 190 is adjustable, and the resonant frequency of the parasitic element 231 is thus changeable.

As illustrated in FIGS. 21A, 21B, 21C, 22A and 22B, the grooves 502 are each separate from the radiation electrode (i.e., the driven element 221 and the parasitic element 231). The grooves 502 extend from the first surface 504 or the second surface 506 to at least a level between the second surface 506 and the surface 512 (layer) on which the radiation electrode is disposed. Referring to FIGS. 21A, 21B, 21C, 22A and 22B, two grooves 502 are provided. Alternatively, one groove 502 may be provided, or three or more grooves 502 may be provided.

Both the embodiment in which grooves are provided in the dielectric substrate 130 and the embodiment in which grooves are provided in the housing 500 offer an advantage in that the (effective) dielectric constant of the portion between the radiation electrode and the ground conductor 190 is adjustable, and the resonant frequency of the radiation electrode is thus changeable.

MODIFICATIONS

The embodiments above should not be construed as limiting the scope of the present disclosure. It should be noted that the present disclosure is not limited to the embodiments above and various alterations and applications are possible.

(1) Although an embodiment has been described above in which the driven element viewed in plan is rectangular, the driven element viewed in plan may, for example, be elliptic, circular, or substantially rectangular.

(2) Although an embodiment has been described above in which the grooves extend along the sides of the driven element or the sides of the parasitic element, the grooves may be provided in other sites. The number of grooves in the embodiment above is not limited. For example, one groove or three grooves may be provided for one driven element. That is, at least one groove is provided for one driven element. Although an embodiment has been described above in which the grooves viewed in plan are rectangular, the grooves viewed in plan may, for example, be elliptic, circular, or substantially rectangular.

An embodiment has been described above in which two grooves are each separate from the driven element in the direction in which radio-frequency signals radiated from the driven element are polarized. The same holds for the case in which the driven element is not rectangular. Two additional grooves may also be provided in such a manner that the grooves are each separate from the driven element in a direction orthogonal to the direction in which radio-frequency signals radiated from the driven element are polarized.

(3) An embodiment has been described above in which the grooves provided for one driven element have the same depth and the same shape and are located at the same distance apart from the driven element concerned. Alternatively, at least one of the depth, the shape, and the distance from the driven element concerned may vary from groove to groove. This configuration allows for greater flexibility in forming grooves.

(4) In the seventh to tenth embodiments described above, the parasitic element 231 is disposed between the driven element 221 and the mounting surface 132. Alternatively, the driven element 221 may be disposed between the parasitic element 231 and the mounting surface 132. In the seventh to tenth embodiments described above, the area of the parasitic element 231 is greater than the area of the driven element 221 when the antenna module is viewed in plan. Alternatively, the area of the driven element 221 may be greater than the area of the parasitic element 231 when the antenna module is viewed in plan.

(5) Microstrips are included as transmission lines of the antenna module according to any one of the embodiments described above. In some embodiments, other types of transmission lines, such as strip lines, may be included.

(6) The following describes modifications of the antenna module 100F (see FIGS. 13A and 13B). FIG. 23 is a sectional view of a modification of the antenna module 100F, illustrating the antenna module taken along a plane passing through the feed point 251. The differences between the antenna module illustrated in FIGS. 13A and 13B and the antenna module illustrated in FIG. 23 are as follows. Referring to FIGS. 13A and 13B, the parasitic element 231 is disposed between the driven element 221 and the ground conductor 190. Referring to FIG. 23, the driven element 221 is disposed between the parasitic element 231 and the ground conductor 190. In this case, the resonant frequency of the driven element 221 and the resonant frequency of the parasitic element 231 are changeable. The groove 302 of the antenna module illustrated in FIG. 23 may be replaced with the groove 312 (see FIG. 15B). Alternatively, the groove 302 of the antenna module illustrated in FIG. 23 may be replaced with the groove 322 (see FIG. 17B).

(7) An embodiment has been described above in which the RFIC 110 is mounted on the mounting surface 132. The mounting surface 132 is opposite to the placement surface 131 on which the driven element 140 is disposed. Alternatively, the RFIC 110 may be mounted on the placement surface 131 on which the driven element 140 is disposed.

(8) An embodiment has been described above in that the dielectric substrate 130 has a multilayer structure. Alternatively, the dielectric substrate 130 may be a monolayer if necessary.

(9) An embodiment has been described above with reference to, for example, FIG. 2B in which the driven element 140 is exposed. Alternatively, the driven element 140 may be overlaid with a protective layer that protects the driven element 140. The placement surface 131 (i.e., the surface on which the driven element 221 is disposed) may refer to the surface of the dielectric substrate 130 and/or to a surface of a layer within the dielectric substrate.

(10) The driven element 140 and the ground conductor 190 of the antenna module according to any one of the embodiments above are disposed in the same dielectric substrate (see, for example, FIGS. 2A and 2B). Alternatively, the driven element 140 may be disposed in a dielectric substrate, and the ground conductor 190 may be disposed in another dielectric substrate. FIG. 24 is a sectional view of an antenna module 100P according to a modification of the embodiment above, illustrating the antenna module 100P taken along a plane passing through the feed point 191. Referring to FIG. 24, two discrete dielectric substrates are provided and are denoted by 130A and 130B, respectively. The driven element 140 is disposed in a dielectric substrate 130A, and the ground conductor 190 is disposed in the dielectric substrate 130B. Referring to FIG. 24, a feed line 161A and a feed line 161B are disposed in the dielectric substrates 130A and 130B, respectively. The feed lines 161A and 161B are connected to each other through a solder bump 540. Radio-frequency signals are transmitted from the RFIC 110 to the driven element 140 through the feed line 161B, the solder bump 540, and the feed line 161A. The dielectric substrate 130B and the RFIC 110 may, for example, be mounted on a mounting substrate (not illustrated). The antenna module 100P, which is illustrated in FIG. 24, does not include the ground conductor 190. The antenna module 100P may include the driven element 140 and a dielectric substrate in which at least one groove 150 is provided. Referring to FIG. 24, the dielectric substrate of the antenna module 100*p* is denoted by 130A.

(11) Referring to FIGS. 2A and 2B, for example, each of the grooves 150 is a recess enclosed with four side walls. Alternatively, each groove may be a cutout obtained by cutting out one, two, or three of the four side walls. FIG. 25 is a sectional view of an antenna module 100Q according to another modification of the embodiment above, illustrating the antenna module 100Q taken along a plane passing through the feed point 191. Referring to FIG. 25, grooves 550 provided in the antenna module 100Q are cutouts. The antenna module in this modification may include an array of driven elements arranged as illustrated in, for example, FIGS. 5A and 5B. In this case, the second groove 152 and the third groove 153, which are provided on the respective edges in the direction of the X axis, are cutouts. The first groove 151, which is in the midsection between the other two grooves in the direction of the X axis, is a recess enclosed with four side walls.

(12) FIG. 26 is a sectional view of an antenna module 100R according to still another modification of the embodiment above, illustrating the antenna module 100R taken along a plane passing through the feed point 191. Referring to FIG. 26, the antenna module 100R includes another line, which is independent of the feed line 161 and is denoted by 560. The line 560 is disposed between the feed point 191 and an edge of the dielectric substrate 130 in the direction in which radio-frequency signals radiated from the driven element 140 are polarized. One end of the line 560 is connected to the driven element 140, and the other end of the line 560 is connected to the ground conductor 190. With the addition of the line 560, the antenna module 100R may be configured as an inverted-F antenna; that is, the driven element 140 of the antenna module 100R may be smaller than the driven element 140 described above with reference to, for example, FIGS. 2A and 2B.

(13) As the size of the antenna module illustrated in FIG. 2A is reduced, the distance between the side 140*a* of the driven element 140 and the corresponding edge of the dielectric substrate 130 (e.g., a side of the dielectric substrate 130 that is closer than the other three sides of the dielectric substrate 130 to the side 140*a*) in the direction in which radio-frequency signals radiated from the driven element 140 are polarized is reduced correspondingly. Due to this increased proximity, the antenna module may fail to ensure that the desired frequency band is covered. The antenna module in this modification may be reduced in size in such a way as to ensure that the desired frequency band is covered. FIG. 27 illustrates the dielectric substrate 130 included in an antenna module 100S according to still another modification of the embodiment above and viewed in plan in the direction of the Z axis. Referring to FIG. 27, the driven element 140 is disposed in such a manner that the direction in which radio-frequency signals radiated from the driven element 140 are polarized forms a predetermined angle with a side 570, which is one of four sides of the dielectric substrate 130 (i.e., an edge of the dielectric substrate 130). The dielectric substrate 130 has the grooves 150. The predetermined angle is neither 90° nor 180°. The antenna module 100S may thus be reduced in size in such a way as to ensure that the side 140*a* of the driven element 140 is at a sufficient distance from the corresponding edge (e.g., the side 570) of the dielectric substrate 130 in the polarization direction. This means that the antenna module 100S may be reduced in size in such a way as to ensure that the desired frequency band is covered by the antenna module 100S.

(14) The effective dielectric constant εr of the antenna module illustrated in, for example, FIGS. 2A and 2B is attributable to the presence of air in the grooves 150. Filling the grooves 150 with a substance other than air may be an alternative way of reducing the effective dielectric constant εr of the antenna module. FIG. 28 is a sectional view of an antenna module 100T according to still another modification of the embodiment above, illustrating the antenna module 100T taken along a plane passing through the feed point 191. Referring to FIG. 28, the grooves 150 are filled with a substance other than air; or more specifically, the grooves 150 are filled with resin, which is denoted by 580. The dielectric constant of the resin 580 is lower than the dielectric constant of the dielectric substrate 130. With the grooves 150 of the antenna module 100T being filled with resin, the portions in which the grooves 150 are provided increase in strength.

(15) The driven element 140 of the antenna module illustrated in, for example, FIGS. 2A and 2B radiates radio-frequency signals in one direction. Alternatively, the driven element 140 of the antenna module may be configured to radiate radio-frequency signals in two or more directions. FIG. 29 is a sectional view of an antenna module 100U according to still another modification of the embodiment above, illustrating the antenna module 100U taken along a plane passing through the feed point 191. The antenna module 100U includes a flexible substrate 160. The flexible substrate 160 is bent in a manner so as to form a predetermined angle. For example, the flexible substrate 160 is bent about 90°.

A dielectric substrate 130A (see FIG. 24) and a dielectric substrate 730 are provided on the respective end portions of the flexible substrate 160. An antenna element 721 is disposed on the dielectric substrate 730. An antenna element 121 is disposed on the dielectric substrate 130A. The direction normal to the antenna element 121 on the dielectric substrate 130A is orthogonal to the direction normal to the antenna element 721 on the dielectric substrate 730. The angle which the direction normal to the antenna element 121 forms with the direction normal to the antenna element 721 is not limited to 90° and may, for example, be 70° or 80°.

The flexible substrate 160 has a mounting surface 692, on which terminal electrodes are disposed. The mounting surface 692 is opposite to the placement surface 131, in which the grooves 150 are provided. Referring to FIG. 29, the terminal electrodes disposed on the mounting surface 692 are denoted by 690A, 690B, 690C, and 690D, respectively. The RFIC 110 is connected to the antenna element 721 through the terminal electrode 690A and a feed line 761. Radio-frequency signals are transmitted from the RFIC 110 to the antenna element 721 through the terminal electrode 690A and the feed line 761 accordingly. The RFIC 110 is connected to the antenna element 121 through the terminal electrode 690B and the feed line 161. Radio-frequency signals are transmitted from the RFIC 110 to the antenna element 121 through the terminal electrode 690B and the feed line 161 accordingly. With the terminal electrodes being disposed on the surface opposite to the placement surface 131, in which the grooves 150 are provided, some of the terminal electrodes face the grooves 150. Referring to FIG. 29, the terminal electrodes 690A and 690D face the respective grooves 150.

(16) The antenna module may be detachable from a substrate. FIG. 30 is a sectional view of an antenna module 100V according to still another modification of the embodiment above, illustrating the antenna module 100V taken along a plane passing through the feed point 191. As illustrated in FIG. 30, a terminal electrode 690D is disposed in a manner so as to face one of the grooves 150. The terminal electrode 690D is provided with a connector 750A. A mounting substrate 20 is provided with a connector 750B. The connectors 750A and 750B are detachable from each other. The antenna module 100V is thus detachable from the mounting substrate 20. Referring to FIG. 30, the RFIC 110 may be disposed on the mounting substrate 20 as indicated by a broken line. As indicated by another broken line, the RFIC 110 may be disposed on a surface of the substrate opposite to a surface on which the antenna element 721 is disposed, and the RFIC 110 faces the antenna element 721 with the substrate therebetween.

The antenna module 100V offers an advantage in that the uppermost layer of the antenna module 100V in the site where one of the grooves 150 is located (i.e., a bottom surface 150M of the groove 150) is in close proximity to the connector 750A. When there is no close fit between the connector 750A and the connector 750B, a mounting jig (not illustrated) or the like may be pressed against the bottom surface 150M of the groove 150. In this way, the connector 750A is fitted into the connector 750B by application of a small force.

(17) An embodiment has been described above in that the dielectric substrate 130 is a plate-like member. Alternatively, the dielectric substrate 130 may be a dielectric member that is not plate-like in shape.

It should be understood that the presently disclosed embodiments are illustrative and not restrictive in all respects. The scope of the embodiments is defined by the appended claims rather than by the description of the embodiments above, and all modifications and alterations within the meaning and scope of the claims or the equivalence thereof are therefore intended to be embraced by the present disclosure.

10 communication device
100 antenna module
111A to 111D, 113A to 113D, 117 switch
112AR to 112DR low-noise amplifier
112AT to 112DT power amplifier
114A to 114D attenuator
115A to 115D phase shifter
140 driven element
141 first driven element
142 second driven element
143 third driven element
144 fourth driven element
150 groove
151 first groove
152 second groove
153 third groove
154 fourth groove
155 fifth groove
156 sixth groove
160 flexible substrate
161, 162 feed line
190 ground conductor
221 driven element
231 parasitic element
400 housing

The invention claimed is:

1. An antenna module, comprising:

a dielectric member; and at least one radiation electrode in or on the dielectric member, wherein the dielectric member has at least one groove separate from the at least one radiation electrode, wherein the groove extends toward a ground electrode from a surface on which the at least one radiation electrode is located, the ground electrode facing the at least one radiation electrode, wherein the dielectric member has a multilayer structure, wherein the at least one radiation electrode comprises:

a driven element that is on a layer of the dielectric member and that is supplied with radio-frequency power from a power supply circuit, and a parasitic circuit element that is on another layer of the dielectric member and that is not supplied with radio-frequency power from the power supply circuit, wherein the driven element and the parasitic circuit element overlap each other when the antenna module is viewed in a plan view in a direction normal to the dielectric member, and wherein the at least one groove overlaps the parasitic circuit element when the antenna module is viewed in the plan view.

2. The antenna module according to claim 1, wherein:

the at least one radiation electrode is rectangular and is configured to radiate a radio-frequency signal polarized in a first polarization direction, the at least one groove is a plurality of grooves, and the plurality of grooves comprises grooves that extend along sides of the at least one radiation electrode in a direction orthogonal to the first polarization direction.

3. The antenna module according to claim 2, wherein the grooves extending in the direction orthogonal to the first polarization direction are arranged symmetrically about the at least one radiation electrode.

4. The antenna module according to claim 2, wherein the plurality of grooves further comprises grooves extending along sides of the at least one radiation electrode in the first polarization direction.

5. The antenna module according to claim 4, wherein the grooves extending in the first polarization direction are arranged symmetrically about the at least one radiation electrode.

6. The antenna module according to claim 4, wherein the at least one radiation electrode is configured to radiate a radio-frequency signal polarized in the first polarization direction and a radio-frequency signal polarized in a second polarization direction, the second polarization direction being orthogonal to the first polarization direction.

7. The antenna module according to claim 1, wherein:

the at least one radiation electrode is a plurality of radiation electrodes, the plurality of radiation electrodes comprises a first radiation electrode and a second radiation electrode that are adjacent to each other when the antenna module is viewed in the plan view, and the at least one groove comprises a first groove located between the first radiation electrode and the second radiation electrode.

8. The antenna module according to claim 7, wherein:

the at least one groove is a plurality of grooves, and the plurality of grooves comprises, in addition to the first groove:

a second groove that is opposite the first groove with the first radiation electrode located between the first and second grooves when the antenna module is viewed in the plan view, and a third groove that is opposite the first groove with the second radiation electrode located between the first and third grooves when the antenna module is viewed in the plan view.

9. The antenna module according to claim 8, wherein:

the plurality of radiation electrodes comprises, in addition to the first and second radiation electrodes, a third radiation electrode and a fourth radiation electrode that are adjacent to each other when the antenna module is viewed in the plan view, the third radiation electrode is adjacent to the first radiation electrode in a direction orthogonal to a direction from the first radiation electrode to the second radiation electrode, the fourth radiation electrode is adjacent to the second radiation electrode in a direction orthogonal to a direction from the second radiation electrode to the first radiation electrode, and the plurality of grooves comprises, in addition to the first, second, and third grooves, a fourth groove that is located between the third radiation electrode and the fourth radiation electrode.

10. The antenna module according to claim 9, wherein the plurality of grooves comprises, in addition to the first, second, third, and fourth grooves:

a fifth groove that is opposite the fourth groove with the third radiation electrode between the fourth and fifth grooves when the antenna module is viewed in the plan view, and a sixth groove that is opposite the fourth groove with the fourth radiation electrode between the fourth and sixth grooves when the antenna module is viewed in the plan view.

11. The antenna module according to claim 1, wherein:

the parasitic circuit element is between the driven element and the ground electrode, and the parasitic circuit element has a larger area than the driven element when the antenna module is viewed in the plan view.

12. The antenna module according to claim 1, wherein the at least one groove is separate from the driven element and extends toward the ground electrode from the layer on which the driven electrode is located.

13. The antenna module according to claim 12, wherein the at least one groove is also separate from the parasitic circuit element and extends toward the ground electrode from the layer on which the parasitic electrode is located.

14. The antenna module according to claim 1, wherein a distance from the at least one radiation electrode to the at least one groove is equal to or greater than 10 μm, and is equal to or less than λ/2, where λ is a wavelength of a radio-frequency signal radiated from the at least one radiation electrode.

15. The antenna module according to claim 1, further comprising the ground electrode in the dielectric member.

16. The antenna module according to claim 1, wherein the at least one groove comprises a step, such that a width of the at least one grove adjacent to a side surface of the driven element is not equal to a width of the at least one groove adjacent to a side surface of the parasitic circuit element.

* * * * *